United States Patent
Bei et al.

(10) Patent No.: US 10,914,497 B2
(45) Date of Patent: Feb. 9, 2021

(54) SYSTEMS AND METHODS FOR COMPONENT PROTECTION

(71) Applicant: SZ DJI TECHNOLOGY CO., LTD., Shenzhen (CN)

(72) Inventors: Shimeng Bei, Shenzhen (CN); Jingjing Wei, Shenzhen (CN); Chuan Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 320 days.

(21) Appl. No.: 15/994,422

(22) Filed: May 31, 2018

(65) Prior Publication Data

US 2018/0283741 A1    Oct. 4, 2018

Related U.S. Application Data

(63) Continuation of application No. PCT/CN2015/096316, filed on Dec. 3, 2015.

(51) Int. Cl.
| | |
|---|---|
| F25B 21/00 | (2006.01) |
| F25B 21/04 | (2006.01) |
| G01C 21/16 | (2006.01) |
| G06F 1/20 | (2006.01) |
| G06F 1/18 | (2006.01) |
| F16F 15/02 | (2006.01) |

(52) U.S. Cl.
CPC ............ *F25B 21/04* (2013.01); *F16F 15/022* (2013.01); *G01C 21/16* (2013.01); *G06F 1/182* (2013.01); *G06F 1/206* (2013.01); *F25B 2321/023* (2013.01); *G06F 2200/201* (2013.01)

(58) Field of Classification Search
CPC ..................................................... B65D 81/02
USPC ................................................. 248/636, 550
See application file for complete search history.

(56) References Cited

U.S. PATENT DOCUMENTS

| | | | |
|---|---|---|---|
| 3,795,291 A | 3/1974 | Naito et al. | |
| 5,207,081 A * | 5/1993 | Fuse | D06F 37/20 68/23.1 |
| 6,634,472 B1 * | 10/2003 | Davis | F16F 7/10 188/378 |
| 7,762,133 B2 | 7/2010 | Chappell et al. | |
| 8,141,452 B2 * | 3/2012 | Wood | B23Q 1/5406 248/179.1 |

(Continued)

FOREIGN PATENT DOCUMENTS

| | | |
|---|---|---|
| CN | 1111391 A | 11/1995 |
| CN | 104908963 A | 9/2015 |

(Continued)

OTHER PUBLICATIONS

The World Intellectual Property Organization (WIPO) International Search Report and Written Opinion for PCT/CN2015/096316 dated Sep. 8, 2016 9 Pages.

*Primary Examiner* — Steven M Marsh
(74) *Attorney, Agent, or Firm* — Anova Law Group, PLLC

(57) ABSTRACT

A component protection apparatus includes a chamber configured to enclose a component that is to be protected and contain a liquid that surrounds the component. The liquid is configured to reduce an amount of an impact on the chamber that is transferred to the component. The component protection apparatus further includes a temperature control system configured to permit heating and cooling of the liquid.

20 Claims, 13 Drawing Sheets

(56) References Cited

U.S. PATENT DOCUMENTS

| | | | |
|---|---|---|---|
| 8,214,148 B2 | 7/2012 | Anderson | |
| 8,291,650 B2 * | 10/2012 | Vreeland | E04H 9/021 |
| | | | 52/167.2 |
| 8,453,512 B2 * | 6/2013 | Sasso | G01C 19/72 |
| | | | 73/663 |
| 9,234,561 B2 * | 1/2016 | Laurens | B64G 1/38 |
| 10,251,717 B2 * | 4/2019 | Devengenzo | A61B 34/37 |
| 2003/0188941 A1 | 10/2003 | Davis et al. | |
| 2005/0265508 A1 * | 12/2005 | Kessler | G21F 1/125 |
| | | | 376/156 |
| 2010/0059911 A1 | 3/2010 | Goepfert et al. | |
| 2010/0125404 A1 | 5/2010 | Anderson | |
| 2011/0100666 A1 | 5/2011 | Wu | |
| 2012/0248282 A1 * | 10/2012 | Malchev | F16F 15/027 |
| | | | 248/550 |

FOREIGN PATENT DOCUMENTS

| | | |
|---|---|---|
| EP | 0487311 A1 | 5/1992 |
| WO | 2008024395 A1 | 2/2008 |
| WO | 2009084981 A1 | 7/2009 |

* cited by examiner

SYSTEMS AND METHODS FOR COMPONENT PROTECTION

CROSS-REFERENCE TO RELATED APPLICATION

This is a continuation application of International Application No. PCT/CN2015/096316, filed on Dec. 3, 2015, the entire contents of which are incorporated herein by reference.

BACKGROUND OF THE DISCLOSURE

Controllers on-board movable devices may be exposed to vibration or impact as the movable object may move around or collide with other objects. In some instances, the controllers may also be exposed to temperature or pressure variations which may affect operation of the controllers.

In the past, vibration-protection mechanisms, have been built for controllers on the movable objects. However, existing vibration-protection mechanisms fail to provide effective vibration and environmental protection in complex environments, which may include wide temperature variations and/or severe vibrations.

SUMMARY OF THE DISCLOSURE

A need exists for improved protective devices for one or more components on-board a movable object. The protective devices may protect the components from vibration or impact, and/or fluctuations in temperature and/or pressure. This may be useful when movable objects are moving within an environment and undergoing vibrations, or are at risk for impact or collision. For instance, the movable objects may be at risk for being hit by a projectile. The movable objects may be vehicles, such as unmanned vehicles. The movable objects may be robots that may perform a task. In some instances, the components may be electronic components that may affect operation of the movable object. For instance, the component may be a controller that may affect propulsion and/or movement of the movable object.

The protective devices may include one or more layers of containers. One or more containers may surround the component to be protected. Dampeners may be provided between the one or more containers to reduce the delivery of an impact force to the component. In some instances, one or more containers may include a liquid that may aid in the reduction of transmittal of an impact force from outside the protective device to the component within the protective device. The temperature and/or pressure of the liquid may be controlled. In some instances, the liquid may be heated and/or cooled to achieve a desired temperature. The pressure of the liquid may be adjusted along with the temperature. The protective device may advantageously provide vibration reduction and/or shock protection to the component within the device. The protective device may also protect the controller from extreme environmental conditions, such as temperature variations or pressure variations.

An aspect of the disclosure may be directed to a component protection apparatus, the apparatus comprising: a chamber configured to (1) enclose a component that is to be protected, and (2) contain a liquid that surrounds the component, wherein the liquid is configured to reduce an amount of an impact on the chamber that is transferred to the component; and temperature control system configured to permit heating and cooling of the liquid. In some embodiments, a movable object may be provided comprising: one or more propulsion units; a component protection assembly as previously described, wherein the component communicates with the one or more propulsion units.

Additional aspects of the disclosure are directed to a method for protecting a component, the method comprising: enclosing a component that is to be protected within a chamber, wherein the chamber is configured to contain a liquid that surrounds the component, wherein the liquid is configured to reduce an amount of an impact on the chamber that is transferred to the component; and providing a temperature control system configured to permit heating and cooling of the liquid.

A component protection apparatus may be provided in accordance with further aspects of the disclosure. The apparatus may comprise: a chamber configured to (1) enclose a component that is to be protected, and (2) contain a liquid that surrounds the component, wherein the liquid is configured to reduce an amount of an impact on the chamber that is transferred to the component; a pressure adjustment mechanism configured to control a pressure of the liquid within the chamber in response to a signal indicative of degree of chamber motion; and a temperature control mechanism configured to control a temperature of the liquid within the chamber, wherein the pressure adjustment mechanism and the temperature control mechanism are capable of operating simultaneously. In some embodiments, a movable object may comprise: one or more propulsion units; and a component protection assembly as previously described, wherein the component communicates with the one or more propulsion units.

Moreover, aspects of the disclosure may be directed to a method of protecting a component, the method comprising: enclosing a component that is to be protected within a chamber, wherein the chamber is configured to contain a liquid that surrounds the component, wherein the liquid is configured to reduce an amount of an impact on the chamber that is transferred to the component; controlling a pressure of the liquid within the chamber, with aid of a pressure adjustment mechanism, in response to a signal indicative of degree of chamber motion; and controlling a temperature of the liquid within the chamber, with aid of a temperature control mechanism, simultaneously with controlling the pressure of the liquid, wherein the chamber is a spherical chamber.

In some aspects, a component protection apparatus may be provided, the apparatus comprising: a chamber configured to (1) enclose a component that is to be protected, and (2) contain a liquid that surrounds the component, wherein the liquid is configured to reduce an amount of an impact on the chamber that is transferred to the component; and an outer support that encloses the chamber, wherein the chamber is supported within the outer support with aid of one or more dampeners. In some embodiments, a movable object may comprise: one or more propulsion units; and a component protection assembly as previously described, wherein the component communicates with the one or more propulsion units.

Aspects of the disclosure may also be directed to a method of protecting a component, the method comprising: enclosing a component that is to be protected within a chamber, wherein the chamber is configured to contain a liquid that surrounds the component, wherein the liquid is configured to reduce an amount of an impact on the chamber that is transferred to the component; and enclosing the chamber within an outer support, wherein the chamber is supported within the outer support with aid of one or more dampeners.

In accordance with some aspects of the disclosure, a component protection apparatus may be provided. The apparatus may comprise: an inner container comprising a rounded shape, wherein the inner container is configured to support a component that is to be protected within the inner container; a chamber comprising a rounded shape that encloses the inner container, wherein the inner container is supported within the chamber; an outer container comprising a rounded shape that encloses the chamber, wherein the chamber is supported within the outer container; and a liquid within at least one of the inner container, the chamber, or the outer container, the liquid configured to reduce an amount of an impact on the outer container that is transferred to the component. In some embodiments, a movable object may comprise: one or more propulsion units; and a component protection assembly as previously described, wherein the component communicates with the one or more propulsion units.

A method of protecting a component may be provided in accordance with further aspects, the method comprising: supporting a component that is to be protected within an inner container comprising a rounded shape; enclosing the inner container within a chamber comprising a rounded shape, wherein the inner container is supported within the chamber; enclosing the chamber within an outer container comprising a rounded shape, wherein the chamber is supported within the outer container; and providing a liquid within at least one of the inner container, the chamber, or the outer container, the liquid configured to reduce an amount of an impact on the outer container that is transferred to the component.

Furthermore, aspects of the disclosure may be directed to a component protection apparatus, the apparatus comprising: an inner container, wherein the inner container is configured to support a component that is to be protected within the inner container; a chamber that encloses the inner container, wherein the inner container is supported within the chamber in a manner that reduces an amount of impact on the chamber that is transferred to the inner container by a first amount; and an outer container that encloses the chamber, wherein the chamber is supported within the outer container in a manner that reduces an amount of impact on the chamber that is transferred to the inner container by a second amount that is greater than the first amount. In some embodiments, a movable object may comprise: one or more propulsion units; and a component protection assembly as previously described, wherein the component communicates with the one or more propulsion units.

Additional aspects of the disclosure may provide a method of protecting a component, the method comprising: supporting a component that is to be protected within an inner container; enclosing the inner container within, wherein the inner container is supported within the chamber in a manner that reduces an amount of impact on the chamber that is transferred to the inner container by a first amount; and enclosing the chamber within an outer container, wherein the chamber is supported within the outer container in a manner that reduces an amount of impact on the chamber that is transferred to the inner container by a second amount that is greater than the first amount.

It shall be understood that different aspects of the disclosure may be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference in its entirety.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Systems and methods are provided for protection of a component on-board a movable object. The movable object may subject the component to vibrations and/or impact that may affect operation of the component. The component may be an electronic component that may affect operation of the movable object. For instance, the component may be a flight controller of an unmanned aerial vehicle (UAV). The component may affect propulsion, communications, data collection or sensing, power distribution, or any other function of the movable object.

A component protection apparatus may protect the component from the vibrations and/or impacts. For instance, force of impact on the movable object and/or component protection apparatus may be reduced for the component. In some embodiments, one or more layers of containers may be provided to protect the component from the vibrations or impacts. Dampeners may be provided between the layers of containers to reduce the force of impact. In some embodiments, liquid may be provided within one or more layers of containers. The liquid may also reduce the force of impact delivered to a component.

The component protection apparatus may also include a temperature control mechanism. The movable object may be subjected to varying temperatures. For instance, if a movable object is traversing an environment, such as different altitudes or levels of shade, the movable object may be exposed to widely changing temperatures that may affect operation of the component. The temperature control mechanism may control the temperature to which the component is exposed. In some instances, the component protection apparatus may include a liquid, and the temperature of the liquid may be controlled.

The component protection apparatus may also include a pressure adjustment mechanism. A pressure of a liquid within the component protection apparatus may be controlled. The pressure may be controlled to affect the level of vibration and/or impact reduction that experienced by the component. The pressure may be controlled based on an environmental pressure around the movable object, or independent of an environmental pressure around the movable object. In some instances, the pressure adjustment mechanism may be operated in conjunction with a temperature control mechanism. Optionally, a pressure of a liquid may be adjusted in response to a temperature adjustment.

The components in the component protection apparatus may be electrically connected to one or more other components of the movable object. The component protection apparatus may provide electrical connections. This may permit the protected components to affect the movable object while remaining physically protected.

Figure 1:
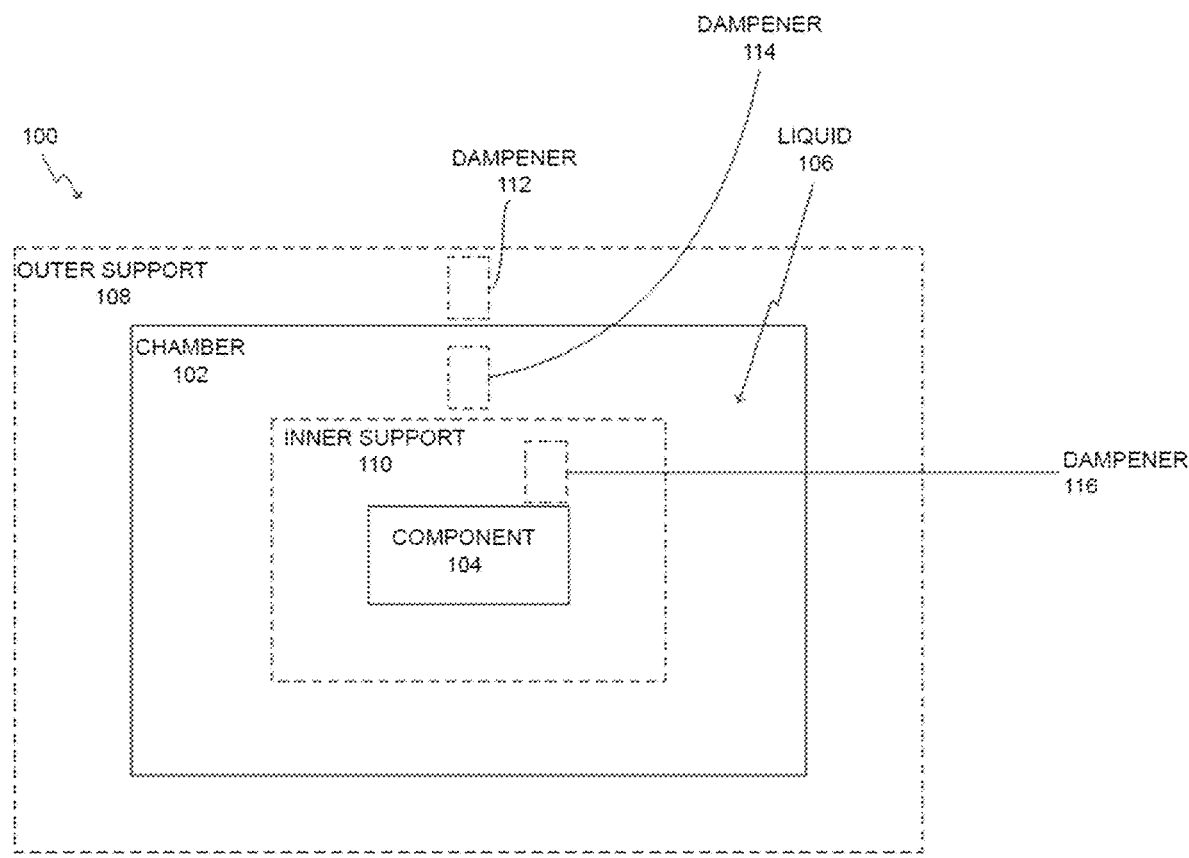
FIG. 1 shows an example of a component protection apparatus in accordance with embodiments of the disclosure.

FIG. 1 shows an example of a component protection apparatus in accordance with embodiments of the disclosure. A component protection apparatus 100 may include a chamber 102 that encloses a component 104. Optionally, a liquid 106 may be provided within the chamber that may reduce a force of impact experienced by the component. Zero, one, or more outer supports 108 may be provided outside the chamber. Zero, one, or more inner supports 110 may be provided within the chamber. Optionally, one or more dampeners 112 may be provided between an outer support and the chamber. Optionally, one or more dampeners 114 may be provided between the chamber and an inner support. Optionally, one or more dampeners 116 may be provided between an inner support and a component.

A chamber 102 may be provided to enclose a component 104. Any description herein of chamber, may also be referred to as an intermediary chamber, a container (or intermediary container), shell (or intermediary shell), cage (or intermediary cage), structure (or intermediary structure), or vice versa. The chamber may be completely enclosing the component or at least partially enclosing the component. Any description herein of a chamber enclosing a component may include a partial enclosure of the component. The chamber may enclose the component by surrounding the component at least 360 degrees, 270 degrees, 180 degrees, or 90 degrees laterally. In some instances, the chamber may enclose the component by surrounding the component at least 360 degrees, 270 degrees, 180 degrees, or 90 degrees vertically. In some instances, the component may be surrounded on all angles by the chamber.

The chamber may be a fluid-tight. In some instances, the chamber may isolate fluids inside the chamber from fluids outside the chamber. The chamber may be gas (air) tight or liquid-tight. For instance, the chamber may prevent liquid or gas from within the chamber to leave the chamber. The chamber may prevent liquid or gas from outside the chamber from entering the chamber. The chamber may prevent a component from falling outside the chamber or escaping the chamber. The chamber may include solid walls. The walls of the chamber may be opaque, translucent, or transparent. The walls may have little or no porosity. Alternatively, the walls may have pores, channels, conduits, holes, openings, windows, cut-outs or any other configuration that may allow fluid communication through the walls. The walls may be formed as netting, mesh, textile, or have any other configuration. The chamber may optionally have a bracket configuration. The walls may be made from a gas permeable or gas impermeable material. The walls may be made from a liquid permeable or liquid impermeable material. In some instances, the chamber may include one or more structural support without requiring full walls. For instance, a skeleton structure may be provided to define a shape of the chamber without requiring walls.

The chamber may be formed from a rigid material. The chamber may be formed from a flexible or resilient material. In some instances, the chamber may be formed from an elastomeric material. The chamber may be formed from plastic, silicone, metal, glass, rubber, metal or any other materials or combinations thereof. The chamber may be capable of deforming on impact. The chamber may or may not spring back to its original shape after impact. The chamber may be able to withstand an impact force of at least 100 N, 500 N, 1 kN, 2 kN, 3 kN, 5 kN, 7 kN, 10 kN, 15 kN, 20 kN, 25 kN, 30 kN, 40 kN, 50 kN, 75 kN, 100 kN, 200 kN, 300 kN, or 500 kN without deforming, or without being damaged. The chamber may be able to withstand an impact of force of any value described herein without damaging any item enclosed within the chamber, or without damaging the component enclosed within the chamber.

The chamber may be formed from a material that is an electrical insulator. For instance, the material may have a high resistivity. For instance, the material may have an electrical resistivity of greater than or equal to about 10, $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ ohm m.

The chamber may be formed from a material that is a thermal insulator. For instance, the material may have a thermal insulation value (e.g., R-value) of greater than or equal to at least about 0.10, 0.15, 0.20, 0.25, 0.30, 0.35, 0.40, 0.45, 0.50, 0.55, 0.60, 0.65, 0.70, 0.75, 0.80, 0.90, 1.0, 1.1, or 1.2 m$^2$·K/w·in. Alternatively, the material may have an R-value less than any of the values described. The material may have an R-value falling within a range between any two of the values described.

The chamber may have any shape. In some instances, the chamber may be substantially spherical. The chamber may have a substantially rounded shape, such as a sphere, ovoid, or ellipsoid. The chamber may have rounded features without any sharp points or edges. Alternatively, the chamber may be shaped with one or more points or edges. In some further examples, the chamber may be a cube, cuboid, cylinder, polygonal prism (e.g., triangular prism, quadrilateral prism, pentagonal prism, hexagonal prism, octagonal prism), cone, tetrahedron, square pyramid, hemisphere, octahedron, dodecahedron, or any other shapes or combinations thereof.

The chamber may have any size. For instance, the chamber may enclose a volume of less than or equal to about 100,000 cm$^3$, 50,000 cm$^3$, 10,000 cm$^3$, 5,000 cm$^3$, 1,000 cm$^3$, 750 cm$^3$, 500 cm$^3$, 300 cm$^3$, 250 cm$^3$, 200 cm$^3$, 150 cm$^3$, 100 cm$^3$, 75 cm$^3$, 50 cm$^3$, 30 cm$^3$, 25 cm$^3$, 20 cm$^3$, 15 cm$^3$, 10 cm$^3$, 7 cm$^3$, 5 cm$^3$, 3 cm$^3$, 2 cm$^3$, 1 cm$^3$, 0.5 cm$^3$, or 0.1 cm$^3$. The chamber may enclose a volume greater than or equal to any of the values described. The chamber may enclose a volume within a range falling between any two of the values described.

The chamber may have a maximum dimension (length, width, height, diagonal, diameter) of less than or equal to about 100 cm, 75 cm, 50 cm, 40 cm, 30 cm, 20 cm, 15 cm, 10 cm, 9 cm, 8 cm, 7 cm, 6 cm, 5 cm, 4 cm, 3 cm, 2 cm, 1 cm, 5 mm, 3 mm, 1 mm, 0.5 mm, or 0.1 mm. The chamber may have a maximum dimension that is greater than any of the values described. The chamber may have a maximum value within a range falling between any two of the values described.

A component 104 may be enclosed within the chamber 102. The component may be a component to be protected with aid of the chamber. The component may be a component that may experience a reduced force of impact with aid of the chamber. The component may be an electronic component. The component may include one or more processors and/or one or more memory storage units. The component may be configured to execute code, programs, or instructions provided by non-transitory media. The component may include one or more circuits or chips (e.g., application-specific integrated circuits (ASICs)). The component may operate on electrical power. The component may be capable of operating while being protected by a component protection apparatus. The component may be capable of receiving power and/or data, and/or transmitting data while being protected by a component protection apparatus.

The component may be a controller of one or more other components of a movable object. For instance, the component may be a flight controller. The component may generate a signal that may affect operation of one or more propulsion units of a movable object. The component may generate a signal that may affect operation of a communications unit, one or more sensors, a power storage or distribution system, a carrier, a payload, a navigation system, a landing system, an emitter (e.g., lighting or sound system), or any other component of the movable object.

The component may store data. The component may store data collected or generated during operation of the movable object. The component may store data about a state of a movable object (e.g., positioning, orientation, movement, location, power usage, detected errors or malfunctions, communications operations, actions performed by the movable object) and/or any data about a state of an environment of the movable object, which may be collected by one or more sensors of the movable object (e.g., images of the environment). The component may store data about communications received by the movable object (which may include navigational or operational commands from an external device) and/or sent by the movable object. In some instances, the component may function as a black box for the movable object and it may be desirable to make the component resistant to damage.

The component may be a sensor. For instance, the component may be an inertial sensor. The component may be part of an inertial measurement unit (IMU). The component may include one or more gyroscopes, accelerometers, magnetometers, or any other type of inertial sensor. The component may be able to detect a position of to one or more, two or more, or three or more spatial directions (e.g., along one, two, or three or more axes). The component may be able to detect an orientation about one or more, two or more, or three or more axes. The component may similarly be able to detect movement, such as linear velocity, linear acceleration, angular velocity, or angular acceleration with respect to one, two, or three or more axes. The component may be able to detect a direction of gravity and relative positioning with respect to the direction of gravity. The component may be able to detect forces or moments experienced by the component.

Other examples of sensors that the component may be, may include one or more of the following: one or more sensors can comprise one or more of: a global positioning system (GPS) sensor, a vision sensor, a temperature sensor, a lidar sensor, an ultrasonic sensor, a barometer, or an altimeter. Any sensor suitable for collecting environmental information can be used, including location sensors (e.g., GPS sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Any description herein of a component may apply to one or more separate pieces. For instance, any description herein of a component may encompass a single or multiple processors, chips, memory units, sensors, and/or any combinations thereof. The pieces of the component may share a common substrate or be connected to one another. Alternatively, the separate pieces of the component may be separable. The pieces of the component may remain at fixed positions relative to one another. Alternatively, the pieces of the component may be movable relative to one another.

The component 104 may have a fixed position relative to the chamber 102. For instance, the component may be rigidly disposed so that it does not move relative to the chamber during operation of the movable object. In some instances, the component may remain at a fixed position relative to chamber even upon impact. Alternatively, the component may move relative to the chamber upon impact. In some embodiments, the component may have a movable position relative to the chamber. For instance, the component may be flexibly disposed so that it may be permitted to move relative to the chamber during operation of the movable object. Vibrations experienced by the chamber may be reduced or removed for the component. In some instances, one or more dampeners 114, 116 may be provided between the component and the chamber.

The chamber may optionally enclose a liquid 106. The liquid may be substantially contained within the chamber. The liquid may, in some embodiments, only escape or enter the chamber through controlled conduits. The liquid may remain substantially static within the chamber, or may flow. The liquid may surround the component. In some instances, the liquid may surround the component about 360 degrees laterally and/or about 360 degrees vertically. The liquid may completely surround the component. The liquid may or may not directly contact the component. The liquid may or may not directly contact an inner surface of a chamber wall.

The liquid may be a dielectric liquid. The liquid may be an electric insulator. For instance, the liquid may have a high resistivity. For instance, the liquid may have an electrical resistivity of greater than or equal to about 10, $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ ohm m. Alternatively, the liquid may have an electrical resistivity lower than any of the values described or falling within a range between any two of the values described. The liquid may have any desired viscosity. In some instances, the liquid may have the same viscosity as water, a lower viscosity than water, or a greater viscosity than water. The liquid may have a viscosity of greater than or equal to $10^{-4}$, $10^{-3}$, $10^{-2}$, 0.1, 0.5, 1, 1.2, 1.3, 1.4, or 1.5 Pa s at 25 degrees C. Alternatively, the liquid may have a viscosity lower than any of the values described or falling within a range between any two of the values described.

The liquid may be a stable liquid with a long lifetime. For instance, the properties of the liquid may not change substantially over at least 1 month, 3 months, 6 months, 1 year, 1.5 years, 2 years, 3 years, 4 years, 5 years, 7 years, 10 years, 15 years, or 20 years.

Some examples of the liquid may be an oil. For instance, the liquid may be a hydraulic oil such as phosphate ester hydraulic oil, or water—ethylene glycol hydraulic oil. In some examples, the liquid may be an oil-in-water emulsion or a water-in-oil emulsion. The liquid may be a solvent. For instance, the liquid may be ethyl alcohol or liquid silicone. The liquid may be an ethyl acetate, ethyl benzoate, ethyl lactate, or cyclohexanone.

The chamber may include a fluid. The fluid may be a liquid as described herein. Alternatively, the fluid may be a gas. For instance, the fluid may be air. The fluid may have the same weight or weigh less than air. The fluid may be an inert gas. The fluid may be electrically insulative (e.g., have any of the resistivity values described elsewhere herein).

Optionally, one or more outer supports 108 may be provided outside the chamber 102. Alternatively, no outer supports may be provided outside the chamber. Any description herein of an outer support may apply to multiple outer supports. For instance a single layer of outer support may be provided outside the chamber. Alternatively, multiple layers of outer supports may be provided outside the chamber (e.g., one or more, two or more, three or more, four or more, five or more, six or more layers of outer support). For instance two layers of outer support may include a first outer layer, which may enclose a second outer layer, which may enclose the chamber. Any description herein of an outer support may apply to a single layer of outer support or multiple layers of outer support.

The outer support may be provided to enclose a chamber. Any description herein of an outer support may also be referred to as an outer container, outer chamber, outer shell, outer cage, outer structure, or vice versa. The outer support may be completely enclosing the chamber or at least partially enclosing the chamber. Any description herein of an outer support enclosing a chamber may include a partial enclosure of the chamber. The outer support may enclose the chamber by surrounding the chamber at least 360 degrees, 270 degrees, 180 degrees, or 90 degrees laterally. In some instances, the outer support may enclose the chamber by surrounding the chamber at least 360 degrees, 270 degrees, 180 degrees, or 90 degrees vertically. In some instances, the chamber may be surrounded on all angles by the outer support.

The outer support may be a fluid-tight. In some instances, the outer support may isolate fluids inside the outer support from fluids outside the outer support. The outer support may be gas (air) tight or liquid-tight. For instance, the outer support may prevent liquid or gas from within the outer support to leave the outer support. The outer support may prevent liquid or gas from outside the outer support from entering the outer support. The outer support may prevent a chamber from falling outside the outer support or escaping the outer support. The outer support may include solid walls. The walls of the outer support may be opaque, translucent, or transparent. The walls may have little or no porosity. Alternatively, the walls may have pores, channels, conduits, holes, openings, windows, cut-outs or any other configuration that may allow fluid communication through the walls. The walls may be formed as netting, mesh, textile, or have any other configuration. The outer support may optionally have a bracket configuration. The walls may be made from a gas permeable or gas impermeable material. The walls may be made from a liquid permeable or liquid impermeable material. In some instances, the outer support may include one or more structural support without requiring full walls. For instance, a skeleton structure may be provided to define a shape of the outer support without requiring walls. The outer support may directly or indirect bear weight of the chamber.

The outer support may be formed from a rigid material. The outer support may be formed from a flexible or resilient material. In some instances, the outer support may be formed from an elastomeric material. The outer support may be formed from plastic, silicone, metal, glass, rubber, metal or any other materials or combinations thereof. The outer support may be capable of deforming on impact. The outer support may or may not spring back to its original shape after impact. The outer support may be able to withstand an impact force of at least 100 N, 500 N, 1 kN, 2 kN, 3 kN, 5 kN, 7 kN, 10 kN, 15 kN, 20 kN, 25 kN, 30 kN, 40 kN, 50 kN, 75 kN, 100 kN, 200 kN, 300 kN, or 500 kN without deforming, or without being damaged. The outer support may be able to withstand an impact of force of any value described herein without damaging any item enclosed within the outer support, or without damaging the chamber enclosed within the outer support.

The outer support may be formed from a material that is an electrical insulator. For instance, the material may have a high resistivity. For instance, the material may have an electrical resistivity of greater than or equal to about 10, $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ ohm m. Alternatively, the outer support may be formed from an electrically conductive material.

The outer support may be formed from a material that is a thermal insulator. For instance, the material may have a thermal insulation value (e.g., R-value) of greater than or equal to at least about 0.10, 0.15, 0.20, 0.25, 0.30, 0.35, 0.40, 0.45, 0.50, 0.55, 0.60, 0.65, 0.70, 0.75, 0.80, 0.90, 1.0, 1.1, or 1.2 m$^2$·K/w·in. Alternatively, the material may have an R-value less than any of the values described. The material may have an R-value falling within a range between any two of the values described.

The outer support may be formed from the same material as the chamber or may share one or more material properties with the chamber. Alternatively, the outer support may be formed from a different material as the chamber or may have one or more material properties different from the chamber.

The outer support may have any shape. In some instances, the outer support may be substantially spherical. The outer support may have a substantially rounded shape, such as a sphere, ovoid, or ellipsoid. The outer support may have rounded features without any sharp points or edges. Alternatively, the chamber may be shaped with one or more points or edges. In some further examples, the outer support may be a cube, cuboid, cylinder, polygonal prism (e.g., triangular prism, quadrilateral prism, pentagonal prism, hexagonal prism, octagonal prism), cone, tetrahedron, square pyramid, hemisphere, octahedron, dodecahedron, or any other shapes or combinations thereof.

The outer support may have the same shape as the chamber. Alternatively, the outer support may have a different shape from the chamber. The outer support and the chamber may be concentrically located. A center of the outer support and a center of the chamber may be at the same location in space, or may be very close to one another (e.g., within 1 mm, 3 mm, 5 mm, 7 mm, 1 cm, 2 cm, 3 cm, 5 cm, 7 cm, or 10 cm of one another). The center of gravity of the outer support and the center of gravity of the chamber may be at the same location in space, or may be very close to one another (e.g., within 1 mm, 3 mm, 5 mm, 7 mm, 1 cm, 2 cm, 3 cm, 5 cm, 7 cm, or 10 cm of one another).

The outer support may have any size. For instance, the outer support may enclose a volume of less than or equal to about 200,000 cm$^3$, 100,000 cm$^3$, 50,000 cm$^3$, 10,000 cm$^3$, 5,000 cm$^3$, 1,000 cm$^3$, 750 cm$^3$, 500 cm$^3$, 300 cm$^3$, 250 cm$^3$, 200 cm$^3$, 150 cm$^3$, 100 cm$^3$, 75 cm$^3$, 50 cm$^3$, 30 cm$^3$, 25 cm$^3$, 20 cm$^3$, 15 cm$^3$, 10 cm$^3$, 7 cm$^3$, 5 cm$^3$, 3 cm$^3$, 2 cm$^3$, 1 cm$^3$, 0.5 cm$^3$, or 0.1 cm$^3$. The outer support may enclose a volume greater than or equal to any of the values described. The outer support may enclose a volume within a range falling between any two of the values described.

The outer support may have a maximum dimension (length, width, height, diagonal, diameter) of less than or equal to about 200 cm, 150 cm, 100 cm, 75 cm, 50 cm, 40 cm, 30 cm, 20 cm, 15 cm, 10 cm, 9 cm, 8 cm, 7 cm, 6 cm, 5 cm, 4 cm, 3 cm, 2 cm, 1 cm, 5 mm, 3 mm, 1 mm, 0.5 mm, or 0.1 mm. The outer support may have a maximum dimension that is greater than any of the values described. The outer support may have a maximum value within a range falling between any two of the values described.

The outer support may be larger than the chamber. The outer support may be sufficiently large such that an inner surface of the outer support may be larger than an outer surface of the chamber. The outer support and the chamber may be arranged so that an inner surface of the outer support does not contact an outer surface of the chamber when the movable object is at rest or in normal operation. An inner surface of the outer support may or may not contact the outer surface of the chamber in the event of a collision of the movable object or a hit by an object on the movable object.

The outer support may optionally enclose a fluid. The fluid may be a gas. Alternatively, the fluid may be a liquid, which may have any property or characteristics of a liquid as described elsewhere herein. The fluid may be substantially contained within the outer support. The fluid may, in some embodiments, only escape or enter the outer support through controlled conduits. The fluid may remain substantially static within the outer support, or may flow. The fluid may surround the chamber. In some instances, the fluid may surround the chamber about 360 degrees laterally and/or about 360 degrees vertically. The fluid may completely surround the chamber. The fluid may or may not directly contact the outer surface of the chamber. The fluid may or may not directly contact an inner surface of an outer support.

In some embodiments, the fluid may be a gas. The fluid may be air. The flight may be a gas that is lighter than air. The fluid may be an inert gas. The fluid may be kept at a pressure that is equal to ambient pressure around the movable object. The fluid may be at a pressure that is greater than ambient pressure, or that is lower than ambient pressure. The fluid between the outer support and chamber may be the same as a fluid within a chamber or may be different from a fluid within a chamber. For instance, the fluid outside the chamber may be a gas while fluid within a chamber may be a liquid. Alternatively, both fluid within and outside the chamber may be a gas, or may be a liquid.

Optionally, one or more dampeners 112 may be provided between the chamber 102 and the outer support 108. The dampeners may permit movement between the chamber and the outer support. In some instances, the dampeners may not cause movement between the chamber and the outer support when the chamber and outer support are at rest. The dampeners may reduce the amount of force experienced by the chamber, relative to the outer support. The dampeners may reduce the amount of vibration experienced by the chamber, relative to the outer support. The dampeners may suspend the chamber within the outer support. The dampeners may prevent the outer surface of the chamber from coming into contact with an inner surface of the outer support. A fluid within an outer support may or may not directly contact a dampener.

When multiple layers of outer support are provided, dampeners may be provided between the layers of outer support. The same types of dampeners may be provided between the layers of outer support and/or between the outer support and the chamber, or different types of dampeners may be provided.

Further details about dampeners may be provided elsewhere herein. For instance, further details about arrangements of dampeners, properties of dampeners, and/or types of dampeners may be described in greater detail elsewhere herein.

Optionally, one or more inner supports 110 may be provided within the chamber 102. The one or more inner supports may be provided outside the component 104. The one or more inner supports may enclose the component therein. Alternatively, no inner supports may be provided within the chamber. Any description herein of an inner support may apply to multiple inner supports. For instance a single layer of inner support may be provided within the chamber. Alternatively, multiple layers of inner supports may be provided within the chamber (e.g., one or more, two or more, three or more, four or more, five or more, six or more layers of inner support). For instance two layers of inner support may include a first inner layer, which may enclose a second inner layer, which may enclose the component and/or be enclosed by the chamber. Any description herein of an inner support may apply to a single layer of inner support or multiple layers of inner support.

The inner support may be provided to enclose a component. Any description herein of an inner support may also be referred to as an inner container, inner chamber, inner shell, inner cage, inner structure, inner ball, or vice versa. The inner support may be completely enclosing the component or at least partially enclosing the component. Any description herein of an inner support enclosing a component may include a partial enclosure of the component. The inner support may enclose the component by surrounding the component at least 360 degrees, 270 degrees, 180 degrees, or 90 degrees laterally. In some instances, the inner support may enclose the component by surrounding the component at least 360 degrees, 270 degrees, 180 degrees, or 90 degrees vertically. In some instances, the component may be surrounded on all angles by the inner support.

The inner support may be enclosed by the chamber. The inner support may be completely enclosed by the chamber or at least partially enclosed by the chamber. Any description herein of an inner support enclosed by a chamber may include a partial enclosure of the inner support. The chamber may enclose the inner support by surrounding the inner support at least 360 degrees, 270 degrees, 180 degrees, or 90 degrees laterally. In some instances, the chamber may enclose the inner support by surrounding the inner support at least 360 degrees, 270 degrees, 180 degrees, or 90 degrees vertically. In some instances, the inner support may be surrounded on all angles by the chamber.

The inner support may be a fluid-tight. In some instances, the inner support may isolate fluids inside the inner support from fluids outside the inner support. The inner support may be gas (air) tight or liquid-tight. For instance, the inner support may prevent liquid or gas from within the inner support to leave the inner support. The inner support may prevent liquid or gas from outside the inner support from entering the inner support. The inner support may prevent a component from falling outside the inner support or escaping the inner support. The inner support may include solid walls. The walls of the inner support may be opaque, translucent, or transparent. The walls may have little or no porosity. Alternatively, the walls may have pores, channels, conduits, holes, openings, windows, cut-outs or any other configuration that may allow fluid communication through the walls. The walls may be formed as netting, mesh, textile, or have any other configuration. The inner support may optionally have a bracket configuration. The walls may be made from a gas permeable or gas impermeable material. The walls may be made from a liquid permeable or liquid impermeable material. In some instances, the inner support may include one or more structural support without requiring full walls. For instance, a skeleton structure may be provided to define a shape of the inner support without requiring walls. The inner support may directly or indirect bear weight of the component.

The inner support may be formed from a rigid material. The inner support may be formed from a flexible or resilient material. In some instances, the inner support may be formed from an elastomeric material. The inner support may be formed from plastic, silicone, metal, glass, rubber, metal or any other materials or combinations thereof. The inner support may be capable of deforming on impact. The inner support may or may not spring back to its original shape after impact. The inner support may be able to withstand an impact force of at least 100 N, 500 N, 1 kN, 2 kN, 3 kN, 5 kN, 7 kN, 10 kN, 15 kN, 20 kN, 25 kN, 30 kN, 40 kN, 50 kN, 75 kN, 100 kN, 200 kN, 300 kN, or 500 kN without deforming, or without being damaged. The inner support may be able to withstand an impact of force of any value described herein without damaging any item enclosed within the inner support.

The inner support may be formed from a material that is an electrical insulator. For instance, the material may have a high resistivity. For instance, the material may have an electrical resistivity of greater than or equal to about 10, $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ ohm m. Alternatively, the inner support may be formed from an electrically conductive material.

The inner support may be formed from a material that is a thermal insulator. For instance, the material may have a thermal insulation value (e.g., R-value) of greater than or equal to at least about 0.10, 0.15, 0.20, 0.25, 0.30, 0.35, 0.40, 0.45, 0.50, 0.55, 0.60, 0.65, 0.70, 0.75, 0.80, 0.90, 1.0, 1.1, or 1.2 $m^2 \cdot K/w \cdot in$. Alternatively, the material may have an R-value less than any of the values described. The material may have an R-value falling within a range between any two of the values described.

The inner support may be formed from the same material as the chamber or may share one or more material properties with the chamber. Alternatively, the inner support may be formed from a different material as the chamber or may have one or more material properties different from the chamber.

The inner support may have any shape. In some instances, the inner support may be substantially spherical. The inner support may have a substantially rounded shape, such as a sphere, ovoid, or ellipsoid. The inner support may have rounded features without any sharp points or edges. Alternatively, the chamber may be shaped with one or more points or edges. In some further examples, the inner support may be a cube, cuboid, cylinder, polygonal prism (e.g., triangular prism, quadrilateral prism, pentagonal prism, hexagonal prism, octagonal prism), cone, tetrahedron, square pyramid, hemisphere, octahedron, dodecahedron, or any other shapes or combinations thereof.

In some instances, the inner support may have a substantially solid core. In some instances, the inner support may be a substantially solid ball, or substantially solid three-dimensional shapes. For instance, the inner support may be a silicone ball. The component may be embedded within the inner support. The solid core of the inner support may optionally have one or more cavities within which the component may rest. Between the inner walls of the cavities and the outer walls of the inner support, the inner support may be substantially solid. The cavities may or may not be fluidically isolated from a fluid surrounding the inner support. In some instances, one or more openings or passageways may enable a fluid from outside the inner support to contact the component. For instance, if a liquid or gas surrounds the inner support, the liquid or gas may be able to contact the component. Alternatively, the cavities may be fluidically isolated from the fluid outside the inner support. A liquid or gas surrounding the inner support may not be able to contact the component.

Alternatively, the inner support may be substantially hollow. Space may be provided within walls of the inner support. The walls of the inner support may have an inner surface that may be exposed to a fluid. The component may rest on an inner wall of the inner support, or on one or more structures within the inner support. The component may optionally be at a fixed position relative to the inner support. The components may or may not be fluidically isolated from a fluid surrounding the inner support. In some instances, one or more openings or passageways may enable a fluid from outside the inner support to contact the component. For instance, if a liquid or gas surrounds the inner support, the liquid or gas may be able to contact the component. Alternatively, the components may be fluidically isolated from the fluid outside the inner support. A liquid or gas surrounding the inner support may not be able to contact the component.

The inner support may have the same shape as the chamber. Alternatively, the inner support may have a different shape from the chamber. The inner support and the chamber may be concentrically located. A center of the inner support and a center of the chamber may be at the same location in space, or may be very close to one another (e.g., within 1 mm, 3 mm, 5 mm, 7 mm, 1 cm, 2 cm, 3 cm, 5 cm, 7 cm, or 10 cm of one another). The center of gravity of the inner support and the center of gravity of the chamber may be at the same location in space, or may be very close to one another (e.g., within 1 mm, 3 mm, 5 mm, 7 mm, 1 cm, 2 cm, 3 cm, 5 cm, 7 cm, or 10 cm of one another).

The inner support may have any size. For instance, the inner support may enclose a volume of less than or equal to about 50,000 $cm^3$, 10,000 $cm^3$, 5,000 $cm^3$, 1,000 $cm^3$, 750 $cm^3$, 500 $cm^3$, 300 $cm^3$, 250 $cm^3$, 200 $cm^3$, 150 $cm^3$, 100 $cm^3$, 75 $cm^3$, 50 $cm^3$, 30 $cm^3$, 25 $cm^3$, 20 $cm^3$, 15 $cm^3$, 10 $cm^3$, 7 $cm^3$, 5 $cm^3$, 3 $cm^3$, 2 $cm^3$, 1 $cm^3$, 0.5 $cm^3$, or 0.1 $cm^3$. The inner support may enclose a volume greater than or equal to any of the values described. The inner support may enclose a volume within a range falling between any two of the values described.

The inner support may have a maximum dimension (length, width, height, diagonal, diameter) of less than or equal to about 75 cm, 50 cm, 40 cm, 30 cm, 20 cm, 15 cm, 10 cm, 9 cm, 8 cm, 7 cm, 6 cm, 5 cm, 4 cm, 3 cm, 2 cm, 1 cm, 5 mm, 3 mm, 1 mm, 0.5 mm, or 0.1 mm. The inner support may have a maximum dimension that is greater than any of the values described. The inner support may have a maximum value within a range falling between any two of the values described.

The inner support may be smaller than the chamber. The inner support may be sufficiently small such that an inner surface of the chamber may be larger than an outer surface of the inner support. The inner support and the chamber may be arranged so that an inner surface of the chamber does not contact an outer surface of the inner support when the movable object is at rest or in normal operation. An inner surface of the chamber may or may not contact the outer surface of the inner support in the event of a collision of the movable object or a hit by an object on the movable object.

The inner support may optionally enclose a fluid. The fluid may be a gas. Alternatively, the fluid may be a liquid, which may have any property or characteristics of a liquid as described elsewhere herein. The fluid may be substantially contained within the inner support. The fluid may, in some embodiments, only escape or enter the inner support through controlled conduits. The fluid may remain substantially static within the inner support, or may flow. The fluid may surround the component. In some instances, the fluid may partially or completely surround the component. The fluid may or may not directly contact the outer surface of the component. The fluid may or may not directly contact an inner surface of an inner support. In some instances, any fluid within the inner support may be the same as the fluid contained within the chamber. The fluid within the chamber may be able to traverse the inner support through one or more openings to an interior portion of inner support. Alternatively, the fluid within the inner support may be separate from the fluid within the chamber but outside the inner support. In some instances, the inner support may be substantially solid so that there is little or no fluid.

In some embodiments, the fluid may be a gas. The fluid may be air. The flight may be a gas that is lighter than air. The fluid may be an inert gas. The fluid may be kept at a pressure that is equal to ambient pressure around the movable object. The fluid may be at a pressure that is greater than ambient pressure, or that is lower than ambient pressure. The fluid between the chamber and inner support may be the same as a fluid within an inner support or may be different from a fluid within an inner support. For instance, the fluid outside the inner support may be a liquid while fluid within an inner support may be a gas. Alternatively, both fluid within and outside the inner support may be a gas, or may be a liquid.

Optionally, one or more dampeners 114 may be provided between the chamber 102 and the inner support 110. The dampeners may permit movement between the chamber and the inner support. In some instances, the dampeners may not cause movement between the chamber and the inner support when the chamber and inner support are at rest. The dampeners may reduce the amount of force experienced by the inner support, relative to the chamber. The dampeners may reduce the amount of vibration experienced by the inner support, relative to the chamber. The dampeners may suspend the inner support within the chamber. The dampeners may prevent the outer surface of the inner support from coming into contact with an inner surface of the chamber. A fluid within a chamber may or may not directly contact a dampener. A fluid within a chamber may be provided between dampeners.

When multiple layers of inner support are provided, dampeners may be provided between the layers of inner support. The same types of dampeners may be provided between the layers of inner support and/or between the inner support and the chamber, or different types of dampeners may be provided.

Optionally, one or more dampeners 116 may be provided between the component 104 and the inner support 110. The dampeners may permit some movement between the component and the inner support. In some instances, the dampeners may not cause movement between the component and the inner support when the component and inner support are at rest. The dampeners may reduce the amount of force experienced by the component, relative to the inner support. The dampeners may reduce the amount of vibration experienced by the component, relative to the inner support. The dampeners may suspend or support the component within the inner support. The dampeners may prevent the outer surface of the component from coming into contact with an inner surface of the inner support. Alternatively, the component may contact the inner surface of the inner support. A fluid within an inner support may or may not directly contact a dampener. A fluid within an inner support may be provided between dampeners.

Any description herein of dampeners may apply to dampeners anywhere within a component protection assembly. For instance, any description herein of dampeners may apply to dampeners between outer support layers, between an outer support and chamber 112, between a chamber and an inner support 114, between inner support layers, or between an inner support layer and component 116. The dampeners between any of the levels described herein may be the same or share one or more of the same characteristics. The dampeners between any of the levels described herein may be different or may have one or more characteristics that are different.

Dampeners may be provided between an outer layer and an inner layer. For instance, for a dampener between an outer support and a chamber, the outer layer may be the outer support and the inner layer may be the chamber. In another example, for a dampener between a chamber and an inner support, the outer layer may be the chamber and the inner layer may be the inner support. For a dampener between an inner support and a component, the outer layer may be the inner support and the inner layer may be the component. The inner layer may be enclosed within the outer layer.

The dampener may reduce the amount of force transferred from the outer layer to the inner layer. The inner layer may experience less force than an outer layer. If a component protection assembly is subjected to an impact or collision, the dampener may reduce the amount of force from the impact or collision experienced by the inner layer, relative to the outer layer. The dampener may reduce the amount of force by at least 1%, 5%, 10%, 15%, 20%, 25%, 30%, 40%, 50%, 60%, 70%, 80% or 90%. The dampener may reduce the amount of vibration experienced by the inner layer, relative to the outer layer. The dampener may reduce the amount of vibration by at least 1%, 5%, 10%, 15%, 20%, 25%, 30%, 40%, 50%, 60%, 70%, 80% or 90%.

Dampeners between different layers may reduce the force experienced by an inner layer relative to an outer layer by the same amount or by different amounts. For instance, a dampener between an outer support and a chamber may reduce the force of impact experienced by the chamber relative to the outer support by a first amount and a dampener between a chamber and an inner support may reduce the force of impact experienced by the inner support by a second amount. The amounts may refer to percentage reductions or Newtons of force that are subtracted. The first amount and the second amount may be the same. Alternatively, the first and second amounts may be different. For instance, the first amount may be greater than the second amount. The first amount may be greater than the second amount by at least 1%, 5%, 10%, 15%, 20%, 25%, 30%, 40%, 50%, 60%, 70%, 80% or 90%. In other instances, the second amount may be greater than the first amount. The second amount may be greater than the first amount by at least 1%, 5%, 10%, 15%, 20%, 25%, 30%, 40%, 50%, 60%, 70%, 80% or 90%. A dampener between an inner support and a component may reduce the force of impact experienced by the component by a third amount. The third amount may be the same as the first amount and/or the second amount. Alternatively, the third amount may be greater than the first amount and/or second amount. The third amount may be greater than the first amount and/or second amount by at least 1%, 5%, 10%, 15%, 20%, 25%, 30%, 40%, 50%, 60%, 70%, 80% or 90%. In other instances, the third amount may be less than the first amount and/or second amount. The third amount may be less than the first amount and/or the second amount by at least 1%, 5%, 10%, 15%, 20%, 25%, 30%, 40%, 50%, 60%, 70%, 80% or 90%. Any additional amounts for any dampeners between any other layers may be provided and may be the same, greater, or less than the other amounts, such as by the values described.

The dampeners may be provided at multiple points between an inner layer and an outer layer. For instance, multiple dampeners may be provided between an inner layer and an outer layer. The dampeners may be positioned so that they are coplanar. Alternatively, the dampeners may be positioned in a three-dimensional space so that the dampeners would not be confined to a single plane. The dampeners may surround a three-dimensional inner layer from all sides. In some instances, the dampeners may be substantially evenly spaced relative to one another. Alternatively, the distribution of dampeners may be uneven or may be clustered. In some instances, there may be sufficient number of dampeners so that the dampeners are at least within 180 degrees, 90 degrees, 80 degrees, 70 degrees, 60 degrees, 50 degrees, 45 degrees, 40 degrees, 30 degrees, 25 degrees, 20 degrees, or 15 degrees of one another. The dampeners may be laterally encircle the inner layer and/or vertically encircle the inner layer. Any number of dampeners may be provided between an inner and outer layer. For instance, one or more, two or more, three or more, four or more, five or more, six or more, eight or more, ten or more, fifteen or more, twenty or more, thirty or more, forty or more, or fifty or more dampeners may be provided between the inner and outer layers. Different numbers and/or arrangements of dampeners may be provided between different sets of layers, or the same number and/or arrangement of dampeners may be provided between the different sets of layers.

Any type of dampeners may be used between the inner and outer layers. The dampeners may have a natural form in a resting state. The dampeners may or may not deform when exposed to a force of impact. The dampeners may or may not return to a natural form when the force of impact is over. In some instances, the dampeners may remain permanently deformed while in other instances, the dampeners may return to a previous shape.

An example of dampeners may include springs. In some instances, the dampeners may be a coiled spring or a helical spring. The dampeners may be a flat spring or a machined. The spring may be a tension spring, compression spring, or a torsion spring. A first end of the spring may be connected to an outer layer while a second end of the spring may be connected to an inner layer. In one example, a first end of a spring may be connected to an inner surface of the outer layer, and a second end of the spring may be connected to an outer surface of the inner layer. The springs may hook onto a connector. The springs may be permanently attached or may be removable. Optionally, the springs may keep an inner layer substantially suspended within an outer layer. A gap may be provided between the inner layer and the outer layer. The natural lengths of the springs may all be substantially the same, or may be different. The spring constants of each of the springs may be substantially the same or may be different.

Another example of dampeners may include pneumatic or hydraulic dampers. In some instances, the dampeners may be a dashpot. The dampeners may have a piston type arrangement. The dampeners may resist motion via viscous friction. In some instances, a dashpot or other friction-based dampener may be used in conjunction with a spring.

Another type of dampener may include an elastomeric material, or a material that may deform. In some instances, the material may be arranged into any shape, such as one or more pillars. For instance, a first end of a pillar may contact an inner layer and a second end of a pillar may contact an outer layer. The pillars may deform upon impact and optionally spring back to their original shape when the impact is over. The pillar may have any shape, such as a substantially cylindrical shape, spherical shape, semi-spherical shapes, ovoid shape, ellipsoid shape, conical shape, prismatic shape, pyramidal shape or any other shape. The dampening material may have a substantially solid shape that may be deformable (e.g., the silicone ball). For instance, the space between the inner and outer layer may be substantially solidly filled with the elastomeric material. One or more cavities may be provided within the elastomeric material to support the inner layer. The dampening material may include multiple pieces that may be used to fill in the space between the inner and outer layer. For instance, the dampening material may include many little balls that may be inserted between inner and outer layers. In some instances, the dampening material may form a cage structure or other structure that may include cavities or space.

The material for the dampeners may include, but are not limited to, silicone, rubber (e.g., saturated rubber or unsaturated rubber), sponge, foam, thermoplastic elastomers, elastin, polyblend, or any other materials. The material may be an elastic polymer. The material may be capable of deforming and/or returning to its natural shape. The material may be a substantially solid material or may include pores, holes, passages, conduits, or other features.

Another type of dampener may employ the use of a magnetic force, electric force, and/or electromagnetic force. For instance, the dampeners may utilize a force of repulsion between magnets and/or force of attraction between magnets. Further examples of magnetic-based dampening systems are provided in greater detail elsewhere herein.

Various types of dampeners may be provided been various layers of a component protection assembly. The same types of dampeners and/or different types of dampeners may be provided between different sets of layers in a component protection assembly. For instance, springs may be provided between an outer support and a chamber while silicone pillars may be provided between a chamber and an inner support. An inner support may optionally have a dampening material within, such as a silicone interior that may support the component.

In some instances, fluids between various layers may aid in the dampening and/or absorption of force. For instance, a liquid may reduce a force of impact. The fluids may be interspersed between the dampeners and/or may increase a force reduction by at least 1%, 3%, 5%, 10%, 15%, 20%, 25%, 30%, 40%, 50%, 60%, 70%, 80%, or 90%. A pressure of the fluid may affect the level of force reduction. For instance, a higher pressure of the fluid may provide a higher degree of force reduction.

Any of the dampeners described herein may have a static level of dampening or a variable level of dampening. The degree of dampening may be varied during use. A damping factor may be adjusted. The degree of damping may be adjusted with aid of alteration of electrical currents, adjustment of pneumatic or hydraulic pressure, operation of a pump or vent, change of mechanical configurations, operation of actuators, or any other technique. In some instances, the damping factor may be adjusted in response to a signal from one or more sensors. The damping factor may be increased when a level of vibration increases. The damping factor may be decreased when a level of vibration decreases. The damping factor may be increased when an imminent impact, hit or collision is detected. Such sensor readings are described in greater detail elsewhere herein. The damping factor may also be adjusted in response to a command from a user. For instance, a user may enter a command with aid of a remote terminal to change the damping factor.

The component protection apparatus may absorb shock of impact and/or vibrations, and reduce the effects on a component. This may improve the lifespan of the component and/or prevent interference with the operation of the component. The component protection apparatus may be carried on-board a movable object.

Figure 2:
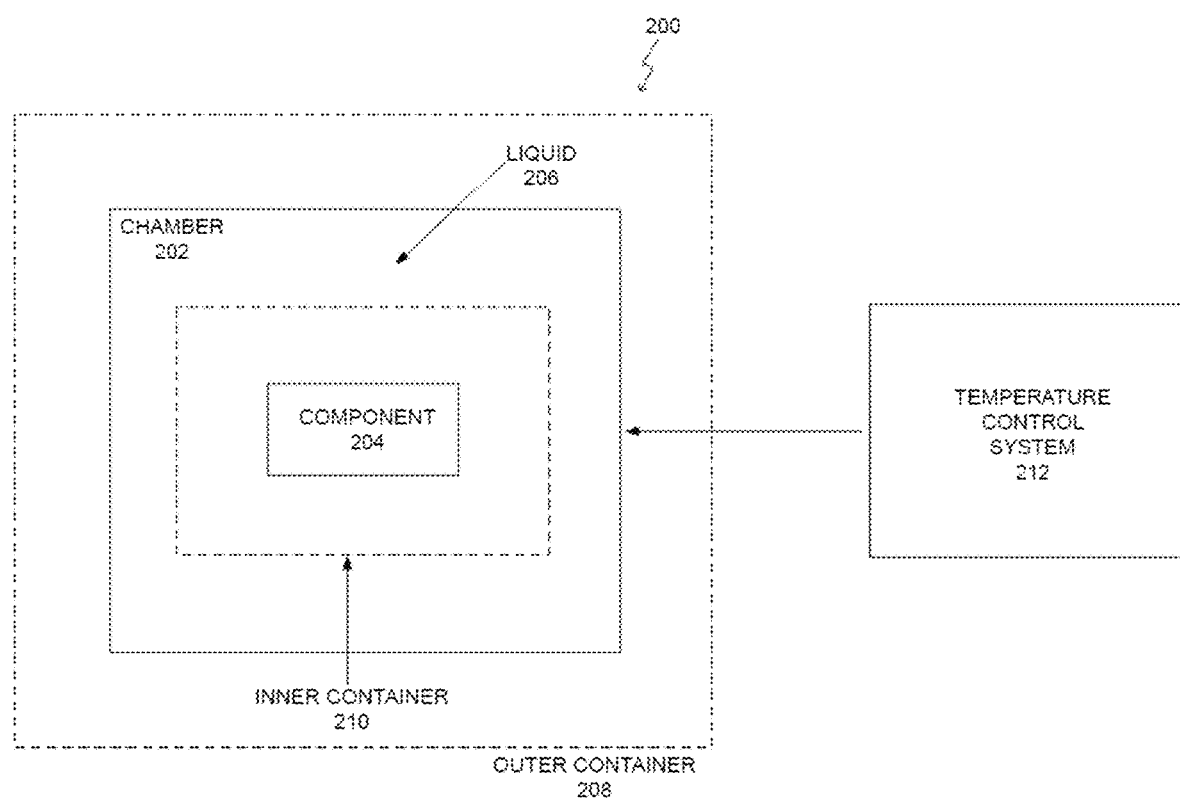
FIG. 2 shows an example of a component protection apparatus that includes a temperature control system in accordance with embodiments of the disclosure.

FIG. 2 shows an example of a component protection apparatus that includes a temperature control system in accordance with embodiments of the disclosure. A component protection apparatus 200 may include a chamber 202 that encloses a component 204. Optionally, a liquid 206 may be provided within the chamber that may reduce a force of impact experienced by the component. Zero, one, or more outer containers 208 may be provided outside the chamber. Zero, one, or more inner containers 210 may be provided within the chamber. A temperature control system 212 may be provided that may control a temperature of one or more elements of a component protection apparatus.

The component protection apparatus may include any of the features and/or characteristics described elsewhere herein in various embodiments.

A temperature control system 212 may control a temperature within any layer of a component protection apparatus. For instance, a temperature control system may control a temperature within a chamber 202. The temperature control system may control a temperature of a fluid within the chamber. The temperature control system may control a temperature within an outer container 208. The temperature control system may control a temperature of a fluid within the outer container. The temperature control system may control a temperature within an inner container 210. The temperature control system may control a temperature of a fluid within the inner container. Any description herein of temperature control within a chamber and/or a fluid within a chamber may be applied to any other layer, such as outer container or inner container.

In one example, a temperature control system 212 may control a temperature of a fluid within a chamber 202. The fluid may be a liquid 206. Alternatively, the fluid may be a gas. Any description herein of a temperature control system controlling a temperature of a liquid within the chamber may apply to any type of fluid, such as a gas. The temperature control system may permit heating and/or cooling of the liquid. The temperature control system may permit both heating and cooling of the liquid. For instance, any description of heating and cooling the liquid may apply to heating and cooling of any fluid within the chamber, such as a gas.

The temperature control system may include a heating element configured to heat the liquid. The temperature control system may include a cooling element to cool the liquid. The temperature control system may include both the heating element and the cooling element. Separate heating and cooling elements may be provided. Alternatively, a single temperature control element may be capable of heating the liquid, cooling the liquid, or both heating and cooling the liquid.

The temperature control system may be located substantially outside the chamber. For instance, the heating element and/or the cooling element may be located outside the chamber. The heating element and/or cooling element may be located outside any other layer, such as an outer container. Alternatively, the heating element and/or the cooling element may be located inside the chamber. The heating element and/or cooling element may be located within any other layer, such as an outer container or inner container. In some embodiments, the single temperature control element may be located outside or inside the chamber, or may be located inside or outside any other layer, such as an outer container or inner container.

A heating element may include any type of temperature controller that may be capable of increasing a heat of the liquid within the chamber. For instance, the heating element may include an electric heating module. The heating element may be an electric resistive heater. The heating element may include metal heating elements, ceramic heating elements, composite heating elements, combination heating elements, or any combination thereof. In some instances, the heating element may be a Peltier device. The heating element may be capable of increasing the temperature of the liquid within the chamber at a rate of at least 0.01 degrees C./s, 0.05 degrees C./s, 0.1 degree C./S, 0.5 degrees C./s, 1 degree C./s, 3 degrees C./s or 5 degrees C./s. The heating element may be capable of operating under low energy usage. For instance, the heating element may use less than or equal to about 1 mW, 5 mW, 10 mW, 20 mW, 30 mW, 50 mW, 100 mW, 500 mW, 1 W, 2 W, 3 W, 5 W, 10 W, 20 W, 30 W, 50 W, 100 W, 200 W, 300 W, 500 W, 750 W, 1000 W, 1200 W, or 1500 W while in operation. The heating element may use more than any of the values described herein, or may use energy falling within a range between any two of the values described herein.

A cooling element may include any type of temperature controller that may be capable of decreasing a temperature of the liquid within the chamber. For instance, the cooling element may be a Peltier device. The cooling element may be any type of thermoelectric cooler. The cooling element may utilize a heat pump. The cooling element may utilize passive cooling elements, such as heat fins or heat sinks, or convection. Alternatively, the cooling element may rely on active cooling elements that may utilize electricity. In some embodiments, cooling may occur with aid of a refrigeration system, such as a vapor compression refrigeration system, or an absorption refrigeration system. The cooling element may be capable of decreasing the temperature of the liquid within the chamber at a rate of at least 0.01 degrees C./s, 0.05 degrees C./s, 0.1 degree C./S, 0.5 degrees C./s, 1 degree C./s, 3 degrees C./s or 5 degrees C./s. The cooling element may be capable of operating under low energy usage. For instance, the cooling element may use less than or equal to about 1 mW, 5 mW, 10 mW, 20 mW, 30 mW, 50 mW, 100 mW, 500 mW, 1 W, 2 W, 3 W, 5 W, 10 W, 20 W, 30 W, 50 W, 100 W, 200 W, 300 W, 500 W, 750 W, 1000 W, 1200 W, or 1500 W while in operation. The cooling element may use more than any of the values described herein, or may use energy falling within a range between any two of the values described herein.

In some instances, a temperature control element may be capable of both increasing and decreasing the temperature of the liquid within the chamber. For instance, the temperature control element may be a Peltier device. The Peltier device may be configured to heat the liquid when a positive current is applied to the Peltier device. The Peltier device may be configured to cool the liquid when a negative current is applied to the Peltier device.

The heating element, cooling element, and/or temperature control element may be capable of modifying or maintaining a temperature of a liquid while outside the chamber. The temperature control system may flow the liquid to the chamber. Liquid from the chamber may be flowed to the heating element, cooling element, and/or temperature control element to modify or maintain the temperature. The fluid flow may occur with aid of a pump.

The heating element may turn on as needed. The heating element may be turned off when not needed. The heating element may supply a constant amount of heat. Alternatively, the heating element may supply a varying amount of heat. The amount of heat may be controlled. Similarly, the cooling element may turn on as needed. The cooling element may be turned off when not needed. The cooling element may remove a constant amount of heat. Alternatively, the cooling element may remove a varying amount of heat. The amount of heat removed may be controlled. The heating element and the cooling element may be controlled in concert to achieve a desired temperature. Alternatively, they may be separately controlled. A temperature control element capable of both heating and cooling may be turned on or off, or switched between heating and cooling modes as needed. The temperature control element may supply a constant amount of heat or remove a constant amount of heat. The temperature control element may supply a varying amount of heat or remove a varying amount of heat.

One or more temperature sensors may be provided within a component protection apparatus. The component protection apparatus may include one or more sensors at any layer. For instance, one or more sensors may be provided outside an outer container, at an outer container, between layers of outer container, within an outer container, outside a chamber, at a chamber, within a chamber, outside an inner container, at an inner container, between layers of inner containers, within an inner container, and/or at a component. The sensors may detect a temperature of a fluid outside an outer container, within an outer container, within a chamber, or within an inner container. The sensors may detect a temperature of an outer container, chamber, inner container, or component itself. In one example, the sensor may detect a temperature of a fluid which may be temperature controlled by the temperature control system. For instance, if a temperature control system controls a temperature of a liquid within a chamber, the sensor may detect a temperature of the liquid within the chamber. In another example, a sensor may detect a temperature of a component to be protected and/or kept at a desired temperature.

The one or more sensors may detect a temperature and generate a signal that may be provided to a controller of the temperature control system. The controller of the temperature control system may receive one or more signals from one or more corresponding temperature sensors. The controller may generate one or more signals to control a heating element, a cooling element, and/or a temperature control element capable of both heating and cooling. The signal from the controller may effect operation of the heating element, the cooling element and/or the temperature control element as previously described. For instance, the heating element, the cooling element, and/or temperature control element may be turned on or off, or a degree of heating or cooling performed by any of these elements may be controlled.

The controller may generate the signal based on the one or more signals from the temperature sensors. For instance, if the signal indicates that the temperature has fallen beneath a desired lower threshold temperature or range, the controller may turn on a heating element and/or cause a temperature element to turn on its heating mode, and heat the fluid. The fluid may be heated until a temperature sensor indicates the temperature has passed back past the desired lower threshold or within the desired temperature range. Similarly, if the signal indicates that the temperature has risen above a desired upper threshold temperature or range, the controller may turn on a cooling element and/or cause a temperature element to turn on its cooling mode, and cool the fluid. The fluid may be cooled until a temperature sensor indicates the temperature has passed back beneath the desired upper threshold or within the desired temperature range. In some instances, a temperature range may include a single temperature value, or may include multiple temperature values. In some instances, a sensor may be continuously collecting information about the temperature and delivering the information to the controller (e.g., in real time). Alternatively, the sensor may collect information at periodic intervals, on in response to an event or instruction. In some instances, continuous or frequent periodic measurements may enable the controller to receive up-to-date information so that the controller may respond quickly. In some alternate embodiments, a heating element, cooling element, and/or temperature control element may be switched on for a predetermined length of time when a temperature sensor detects the fluid is too hot or too cold, and then a temperature sensor may re-assess whether the heating element, cooling element, and/or temperature control element may be turned off.

In some examples, the signals from the one or more sensors may be a binary indication of whether the fluid is acceptable, or whether it is too hot or too cold. The controller may or may not receive information about the degree to which the fluid has fallen out of a desired temperature range. In some instances, the signals from the one or more sensors may include an actual temperature measurement, that a controller may compare with a desired temperature range stored in a memory of the controller. The controller may calculate a difference in the temperature and the desired temperature range. In another example, the temperature sensor may make the calculation and send a signal indicative of the difference in the temperature and the desired temperature range to the controller. Based on the size of the difference, the controller may generate a signal to the heating element, cooling element, and/or temperature control element. For instance, if the degree of difference is higher, the heating element, cooling element, and/or temperature control element may be instructed to operate for a longer length of time than if the difference were lower. In another instance, if the degree of difference is higher, the heating element, cooling element, and/or temperature control element may be instructed to operate at a greater degree than if the difference were lower. For instance, if the heating element may be instructed to make the fluid hotter faster than if the difference were lower. Heat may be supplied to the fluid at a higher rate. In some instances, the length of operation and/or degree of operation may depend on a degree of difference between the measured temperature and a desired temperature range. In some instances, the length of operation and/or degree of operation may be directly proportional to the degree of difference. The length of operation and/or degree of operation may be linearly proportional to the degree of difference, exponentially proportional, or have any other relationship.

Advantageously, one or more temperature sensors may be used to provide feedback to the temperature control system. The temperature control system may utilize data form a single sensor or from multiple sensors to control the temperature.

The temperature of the liquid may be controlled to maintain a desired temperature within the liquid. In some instances, the desired temperature within the liquid may be a constant temperature or temperature range. Alternatively, the desired temperature may change over time. In some instances, the desire temperature may include a temperature or a range of temperatures within which the component will not be damaged. The desire temperature may include a temperature or a range of temperatures within which the component will have an extended lifespan, use less energy, or may be able to operate in an optimal or near optimal conditions. In some instances, the desired temperature may be less than or equal to about 0 degrees C., 5 degrees C., 10 degrees C., 20 degrees C., 25 degrees C., 30 degrees C., 35 degrees C., 40 degrees C., 45 degrees C., 50 degrees C., 55 degrees C., 60 degrees C., 65 degrees C., 70 degrees C., 75 degrees C., 80 degrees C., 85 degrees C., or 90 degrees C. The desired temperature may be greater than any of the values described herein. In some embodiments, the desired temperature may fall within a range between any two of the values described. In some instances, the temperature may be kept within a range that is less than or equal to 1 degrees C., 3 degrees C., 5 degrees C., 10 degrees C., 15 degrees C., 20 degrees C., or 30 degrees C. The temperature control system may be able to keep the temperature within less than or equal to 10%, 5%, 3%, 2%, 1%, 0.5% or 0.1% of a desired temperature.

The temperature control of the liquid may be useful for ensuring optimal improved operation of the component and/or improved lifespan of the component. The precision or accuracy of the component may be improved by controlling the temperature. In some instances, the component may use less energy. This may be particularly useful in situations where the component protection apparatus may be subjected to widely varying temperatures. For instance, the component protection apparatus may be mounted on a movable object that may traverse an environment. For instance, as the movable object changes altitude, or is exposed to wind, currents, precipitation, sunlight/shade, or other environmental factors the movable object may experience widely varying temperatures. The temperature control system may ensure that the component experiences a desired temperature despite the variations in the environment.

Any description herein of a single temperature control system may be applied to multiple temperature control systems. For instances, multiple layers may have their own temperature control system. For instance, a first temperature control system may control a temperature of a fluid within an outer container, a second temperature control system may control a temperature of a fluid within a chamber, and/or a third temperature control system may control a temperature of a fluid within an inner container. The multiple temperature control systems may operate independently of one another. Alternatively, they may communicate with one another and/or operate together. They may use separate sensor data, or may share the use of one or more sensors. For instance, they may share data from a sensor measuring a temperature of a component. In another example, they may each use their own sensor data pertaining to the respective fluids that they control Thus, the component protection apparatus may provide both shock protection (i.e., reduction of force of impact or vibration) to a component, and/or temperature control for a component. The shock protection and the temperature control for the component may be provided simultaneously. The shock protection and temperature control may be provided independently of one another. Alternatively, they may affect one another. For instance, if a large impact causes a change in the temperature of the fluid, the temperature control system may respond.

Figure 3:
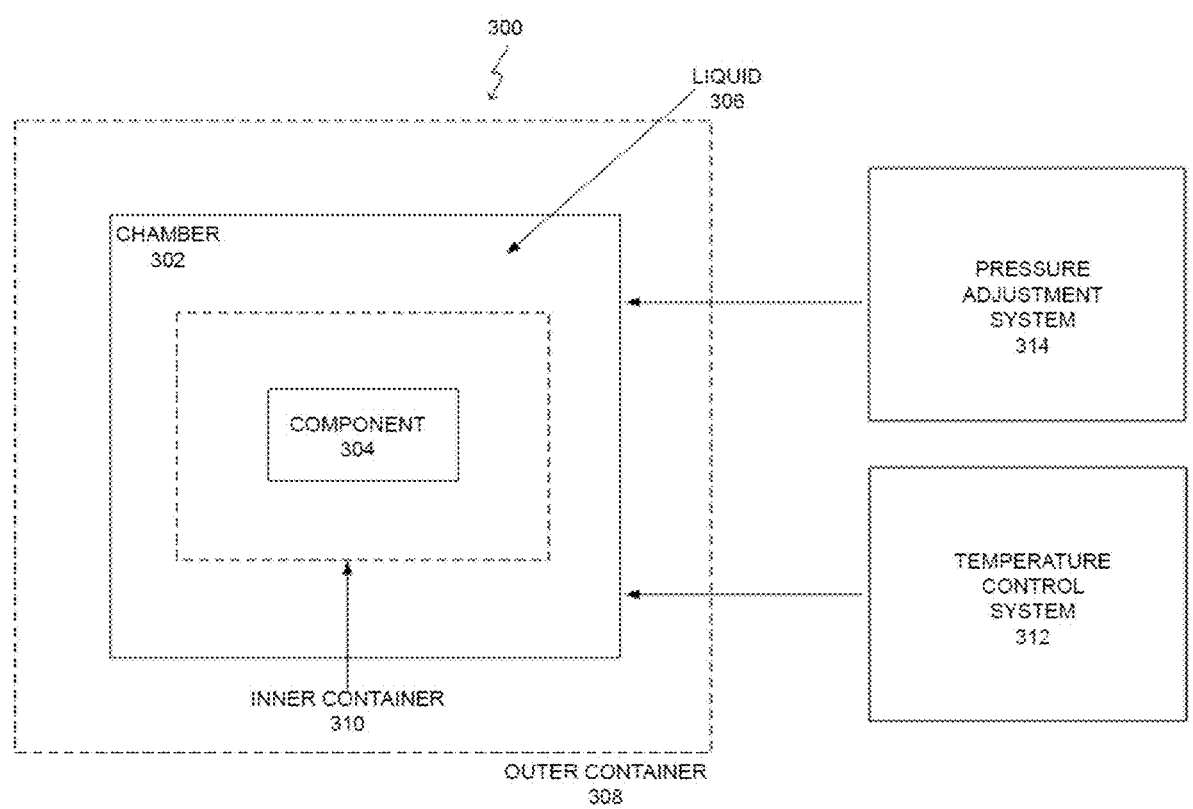
FIG. 3 shows an example of a component protection apparatus with a temperature control system and a pressure adjustment system in accordance with embodiments of the disclosure.

FIG. 3 shows an example of a component protection apparatus with a temperature control system and a pressure adjustment system in accordance with embodiments of the disclosure. A component protection apparatus 300 may include a chamber 302 that encloses a component 304. Optionally, a liquid 306 may be provided within the chamber that may reduce a force of impact experienced by the component. Zero, one, or more outer containers 308 may be provided outside the chamber. Zero, one, or more inner containers 310 may be provided within the chamber. A temperature control system 312 may be provided that may control a temperature of one or more elements of a component protection apparatus. A pressure adjustment system 314 may be provided that may control a pressure of a fluid within one or more layers of a component protection apparatus.

The component protection apparatus and/or temperature control system may include any of the features and/or characteristics described elsewhere herein in various embodiments.

A pressure adjustment system 314 may control a pressure within any layer of a component protection apparatus. For instance, a pressure adjustment system may control a pressure within a chamber 302. The pressure adjustment system may control a pressure of a fluid within the chamber. The pressure adjustment system may control a pressure within an outer container 308. The pressure adjustment system may control a pressure of a fluid within the outer container. The pressure adjustment system may control a pressure within an inner container 310. The pressure adjustment system may control a pressure of a fluid within the inner container. Any description herein of pressure control within a chamber and/or a fluid within a chamber may be applied to any other layer, such as outer container or inner container.

In one example, a pressure adjustment system 314 may control a pressure of a fluid within a chamber 302. The fluid may be a liquid 306. Alternatively, the fluid may be a gas. Any description herein of a pressure adjustment system controlling a pressure of a liquid within the chamber may apply to any type of fluid, such as a gas. The pressure adjustment system may permit increasing and/or decreasing the pressure of the liquid. The pressure adjustment system may permit both heating and cooling of the liquid. For instance, any description of increasing and decreasing the pressure of the liquid may apply to increasing and decreasing pressure of any fluid within the chamber, such as a gas.

The pressure adjustment system may include a pump to adjust a pressure of a liquid. The pump may increase the pressure of the liquid. The pump may decrease the pressure of the liquid. The pump may be capable of both increase and decrease of the pressure of the liquid. Alternatively, separate pumps or elements may be provided for the increase and the decrease of the pressure of the liquid. The pressure adjustment system may utilize a pressure adjustment element to provide any of these functions. A pump may be an example of a pressure adjustment element.

The pressure adjustment system may be located substantially outside the chamber. For instance, the pressure adjustment element may be located outside the chamber. The pressure adjustment element may be located outside any other layer, such as an outer container. Alternatively, the pressure adjustment element may be located inside the chamber. The pressure adjustment element may be located within any other layer, such as an outer container or inner container.

A pressure adjustment element may include any type of apparatus that may be capable of increasing and/or decreasing the pressure of the liquid within the chamber. For instance, the pressure adjustment element may be a pump, such as a hydraulic pump, rotary lobe pump, progressive cavity pump, rotary gear pump, piston pump, diaphragm pump, screw pump, gear pump, rotary vane pump, regenerative (peripheral) pump, peristaltic pump, rope pump, or flexible impeller pump. The pump may be a positive displacement pump (e.g., may use rotary type positive displacement, reciprocating type positive displacement, or linear type positive displacement), gravity pump, steam pump, or valveless pump. The pressure adjustment element may utilize pneumatic piston compression or electric piston compression. The pressure adjustment element may be capable of increasing and/or decreasing the pressure of the liquid within the chamber at a rate of at least 0.1 L/min, 0.3 L/min, 0.5 L/min, 0.7 L/min, 1 L/min, 2 L/min, 3 L/min, 5 L/min, 10 L/min, 15 L/min, 20 L/min, 30 L/min, 40 L/min, or 50 L/min. The rate may be greater than any of the values described, or may fall within a range between any two of the values described. The pressure adjustment element may be capable of operating under low energy usage. For instance, the pressure adjustment element may use less than or equal to about 1 mW, 5 mW, 10 mW, 20 mW, 30 mW, 50 mW, 100 mW, 500 mW, 1 W, 2 W, 3 W, 5 W, 10 W, 20 W, 30 W, 50 W, 100 W, 200 W, 300 W, 500 W, 750 W, or 1000 W while in operation. The pressure adjustment element may use more than any of the values described herein, or may use energy falling within a range between any two of the values described herein.

The pressure adjustment element may be capable of modifying or maintaining a pressure of a liquid while outside the chamber. The pressure adjustment system may flow the liquid to the chamber or out of the chamber. The pressure adjustment element may be control the flow of the liquid to the chamber and/or outer of the chamber. The pressure adjustment element may control the direction of flow and/or the rate of flow. The same pressure adjustment element may be controlled to modify the direction of flow. Alternatively, different pressure adjustment elements may be used for different directions of flow.

In some instances, a fluid reservoir may be provided. The fluid reservoir may store fluid that may be delivered to the chamber or that may be removed from the chamber. The fluid reservoir may be external to the chamber. The pressure adjustment element may control flow of fluid from the fluid reservoir to the chamber, and/or from the chamber to the fluid reservoir. The fluid reservoir may be formed of a rigid structure or flexible structure (e.g., balloon, bag, bladder). The fluid reservoir may have any size relative to the chamber. For instance, the fluid reservoir may have a volume that is less than or equal to about 1%, 5%, 10%, 15%, 20%, 25%, 30%, 40%, 50%, 60%, 70%, 80%, 90%, or 100% of the volume of the chamber. Alternatively, the reservoir may be larger than the chamber. The fluid reservoir may be supported on a common support as the rest of the component protection apparatus. Alternatively, the fluid reservoir may be separately located and/or supported compared to the rest of the fluid protection apparatus. The reservoir may be fluidically connected to the pressure adjustment element. The pressure adjustment may be fluidically connected to the fluid within the chamber.

The pressure adjustment element may turn on as needed. The pressure adjustment element may be turned off when not needed. The pressure adjustment element may flow fluid (e.g., toward the chamber or away from the chamber) at a constant rate. Alternatively, the pressure adjustment element may flow fluid (e.g., toward the chamber or away from the chamber) at variable rates. The rate of fluid flow may be controlled.

One or more pressure sensors may be provided within a component protection apparatus. The component protection apparatus may include one or more sensors at any layer. For instance, one or more sensors may be provided outside an outer container, between layers of outer container, within an outer container, outside a chamber, within a chamber, outside an inner container, between layers of inner containers, within an inner container, and/or outside a component. The sensors may detect a pressure of a fluid outside an outer container, within an outer container, within a chamber, or within an inner container. The sensors may detect a pressure experienced by an outer container, chamber, inner container, or component itself. In one example, the sensor may detect a pressure of a fluid which may be controlled by the pressure adjustment system. For instance, if a pressure adjustment system controls a pressure of a liquid within a chamber, the sensor may detect a pressure of the liquid within the chamber. In another example, a sensor may detect a pressure experienced by component to be protected.

The one or more sensors may detect a pressure and generate a signal that may be provided to a controller of the pressure adjustment system. The controller of the pressure adjustment system may receive one or more signals from one or more corresponding pressure sensors. The controller may generate one or more signals to control a pressure adjustment element capable of increasing and/or decreasing the pressure. The signal from the controller may effect operation of the pressure adjustment element as previously described. For instance, the pressure adjustment element may be turned on or off, or a rate of fluid flow performed by one or more pressure adjustment elements may be controlled.

The controller may generate the signal based on the one or more signals from the pressure sensors. For instance, if the signal indicates that the pressure has fallen beneath a desired lower threshold pressure or range, the controller may turn on a pressure adjustment element to provide additional fluid to the chamber (e.g., increasing the pressure within the chamber). The fluid may be flowed into the chamber until a pressure sensor indicates the pressure has passed back past the desired lower threshold or within the desired pressure range. Similarly, if the signal indicates that the pressure has risen above a desired upper threshold pressure or range, the controller may turn on a pressure adjustment element to remove fluid from the chamber (e.g., decreasing the pressure within the chamber). The fluid may be flowed out of the chamber until a pressure sensor indicates the pressure has passed back beneath the desired upper threshold or within the desired pressure range. In some instances, a pressure range may include a single pressure value, or may include multiple pressure values. In some instances, a sensor may be continuously collecting information about the pressure and delivering the information to the controller (e.g., in real time). Alternatively, the sensor may collect information at periodic intervals, on in response to an event or instruction. In some instances, continuous or frequent periodic measurements may enable the controller to receive up-to-date information so that the controller may respond quickly. In some alternate embodiments, a pressure adjustment element may be switched on for a predetermined length of time when a pressure sensor detects the fluid needs a pressure adjustment, and then a pressure sensor may re-assess whether the pressure adjustment element may be turned off.

In some examples, the signals from the one or more sensors may be a binary indication of whether the fluid is acceptable, or whether the pressure is too high or too low. The controller may or may not receive information about the degree to which the fluid has fallen out of a desired pressure range. In some instances, the signals from the one or more sensors may include an actual pressure measurement, that a controller may compare with a desired pressure range stored in a memory of the controller. The desired pressure range may be adjusted automatically in response to other detected conditions or in response to a command form a user. The controller may calculate a difference in the pressure and the desired pressure range. In another example, the pressure sensor may make the calculation and send a signal indicative of the difference in the pressure and the desired pressure range to the controller. Based on the size of the difference, the controller may generate a signal to the pressure adjustment element. For instance, if the degree of difference is higher, the pressure adjustment element may be instructed to operate for a longer length of time than if the difference were lower. In another instance, if the degree of difference is higher, pressure adjustment element may be instructed to operate at a higher flow rate than if the difference were lower. For instance, if the pressure adjustment element may be instructed to make the fluid flow into or out of the chamber faster than if the difference were lower. In some instances, the length of operation and/or degree of operation may depend on a degree of difference between the measured pressure and a desired pressure range. In some instances, the length of operation and/or degree of operation may be directly proportional to the degree of difference. The length of operation and/or degree of operation may be linearly proportional to the degree of difference, exponentially proportional, or have any other relationship.

Advantageously, one or more pressure sensors may be used to provide feedback to the pressure adjustment system. The pressure adjustment system may utilize data form a single sensor or from multiple sensors to control the pressure.

The pressure of the liquid may be controlled to obtain a desired pressure within the liquid. In some instances, the desired pressure within the liquid may be a constant pressure or pressure range. Alternatively, the desired pressure may change over time. In some instances, the desire pressure may include a pressure or a range of pressures that may achieve a desired vibrational dampening or impact reduction effect. For instance, the pressure within the chamber may be increased to increase dampening for the component if there's an increased amount of vibration, or if a large impact is detected or imminent. The pressure within the chamber may decrease to decrease dampening if there is smooth operation and/or less vibration. The desire pressure may include a pressure or a range of pressure within which the component will experience an acceptable amount of force. In some instances, the pressure may be kept within a range that is less than or equal to 0.01 Pa, 0.05 Pa, 0.1 Pa, 0.5 Pa, 1 Pa, 5 Pa, 10 Pa, 20 Pa, 30 Pa, or 50 Pa. The temperature control system may be able to keep the pressure within less than or equal to 10%, 5%, 3%, 2%, 1%, 0.5% or 0.1% of a desired pressure.

The desired pressure may be substantially static. Alternatively, the desired pressure may be changing. The desired pressure may change automatically in response a manual instruction from a user. For instance, a user may operate a movable object and/or component protection apparatus on board the movable object with aid of a remote controller. The user may provide an input to the remote controller that may adjust a desired pressure. Alternatively, the desired pressure may be adjusted automatically without requiring a manual instruction from a user. The desired pressure may be adjusted automatically in response to one or more detected condition of the component protection apparatus and/or a movable object. The detected condition of the component protection apparatus and/or the movable object may be detected with aid of one or more sensors. For instance, any type of sensor may be utilized that may detect a vibration of the movable object and/or component protection apparatus. The degree of vibration may affect a desired pressure. The sensor may be indicative of a degree of motion of the component protection apparatus (e.g., chamber, any layer, component), and/or the movable object. The signal indicative of chamber motion may be provided by an inertial sensor (or may be part of an IMU). The signal indicative of chamber motion may be indicative of an amplitude or frequency of vibration of the chamber. In some instances, a sensor may detect a condition indicative of an impact or an imminent impact. For instance, if a sensor detects that a movable object is in free-fall, the sensor may detect that an impact with a ground or other surface is imminent. This may also affect the desired pressure. Similarly, the sensor may detect objects that may be approaching the movable object and/or on a collision course with the movable object. The detected object may be another movable object, a living object, a static object, a projectile, or any other type of object. If such a collision is likely or imminent, this may also affect the desired pressure. Increases in amount of vibration may cause the desired pressure to go up, to provide increased dampening. Similarly, a detection of an impact or imminent impact may cause the desired pressure to go up, to provide increased dampening.

The pressure adjustment of the liquid may be useful for ensuring optimal improved operation of the component and/or improved lifespan of the component. The effects of vibration and/or impact may be reduced to a desired amount by adjusting the pressure of the liquid. This may be particularly useful in situations where the component protection apparatus may be subjected to widely varying degrees of vibrations or types of impact. For instance, the component protection apparatus may be mounted on a movable object that may traverse an environment. For instance, as the movable object changes altitude, or is exposed to wind, currents, or other environmental factors the movable object may experience widely varying external forces that may affect vibration. The pressure adjustment system may ensure that the component experiences a desired level reduction of shock despite the variations in the environment.

Any description herein of a single pressure adjustment system may be applied to multiple pressure adjustment systems. For instances, multiple layers may have their own pressure adjustment system. For instance, a first pressure adjustment system may control a pressure of a fluid within an outer container, a second pressure adjustment system may control a pressure of a fluid within a chamber, and/or a third pressure adjustment system may control a pressure of a fluid within an inner container. The multiple pressure adjustment systems may operate independently of one another. Alternatively, they may communicate with one another and/or operate together. They may use separate sensor data, or may share the use of one or more sensors. For instance, they may share data from a sensor measuring a pressure outside a component. In another example, they may each use their own sensor data pertaining to the respective fluids that they control.

Thus, the component protection apparatus may provide both shock protection (i.e., reduction of force of impact or vibration) to a component, and/or temperature control for a component. The component protection apparatus may actively utilize both a pressure adjustment system and a temperature control system to control the shock and temperature experienced by the component. The pressure adjustment system and the temperature control system may be activated simultaneously. The pressure of the fluid and the temperature of the fluid may be monitored and/or controlled simultaneously. Data from sensors may be delivered to a controller of a pressure adjustment system and a temperature control system simultaneously. The controllers of the respective systems may be making calculations and/or sending instructions simultaneously (e.g., at overlapping time intervals). The pressure adjustment system and the temperature control system may be capable of being operated simultaneously. For instance, while the temperature of the fluid is adjusted, the pressure of the fluid may be adjusted. Signals from the respective controllers may be sent to the pressure adjustment element and a heating element, cooling element and/or temperature control element simultaneously (e.g., at overlapping time intervals). The pressure adjustment and temperature control may be provided independently of one another. Alternatively, they may affect one another.

The pressure adjustment element may be in fluid communication with an interior of a chamber via a first liquid passage. The temperature control mechanism (e.g., heating element, cooling element, and/or temperature control element capable of both heating and cooling) may be in fluid communication with an interior of the chamber via a second liquid passage. The first liquid passage and second liquid passages may be different from one another. The pressure adjustment system and the temperature control mechanism may be fluidically separated from one another. Alternatively, the pressure adjustment element and/or a temperature control element may share the same liquid passage to and/or from the interior of the chamber.

Figure 4:
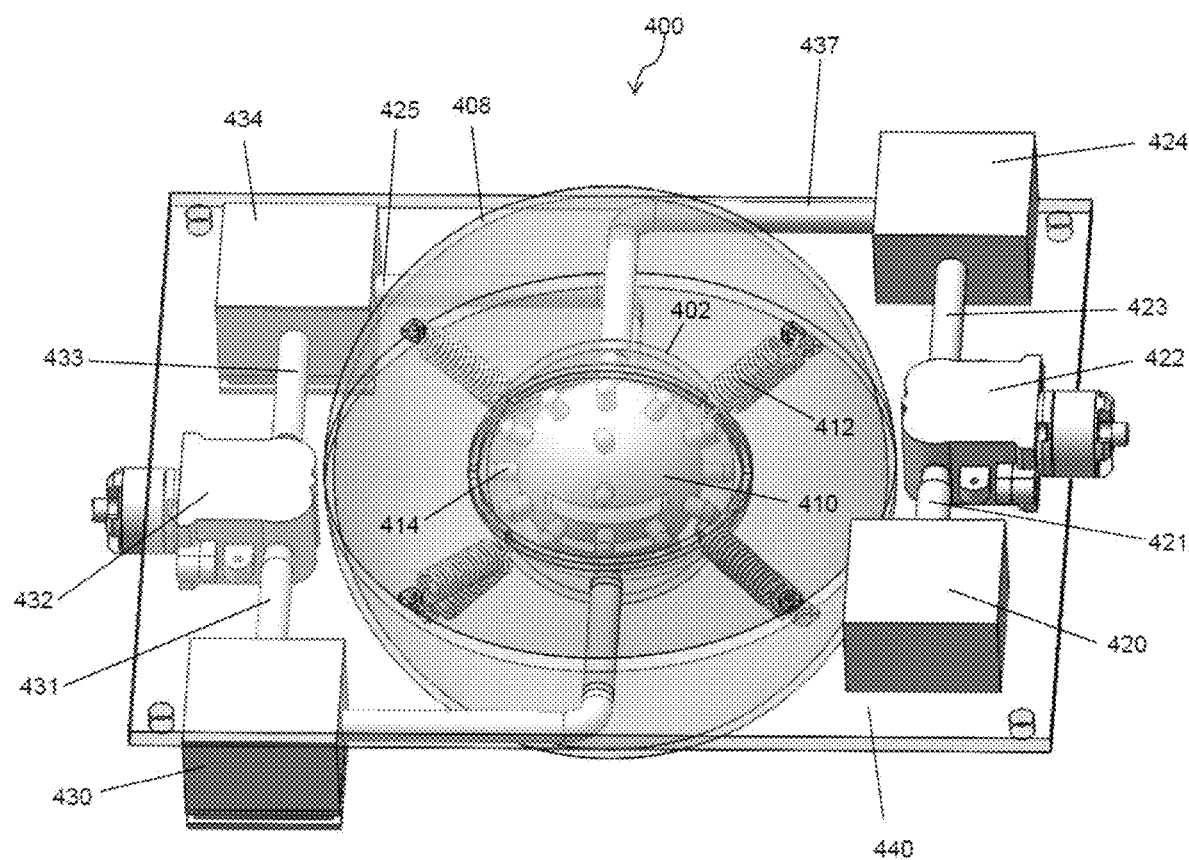
FIG. 4 shows an example of a component protection apparatus that reduces effects of external forces on the component in accordance with embodiments of the disclosure.

FIG. 4 shows an example of a component protection apparatus that reduces effects of external forces on the component in accordance with embodiments of the disclosure. The component protection apparatus 400 may include a chamber 402. Optionally, a liquid may be provided within the chamber that may reduce a force of impact experienced by the component. An outer container 408 may be provided outside the chamber. An inner container 410 may be provided within the chamber. One or more dampeners 412 may be provided between the outer container and the chamber. One or more dampeners 414 may be provided between the chamber and the inner container.

A pressure adjustment system may be provided that may control a pressure of the liquid within the chamber. The pressure adjustment system may include a pump 422 that may control flow of liquid to and/or from the chamber. A reservoir 420 may store liquid that may be provided to the chamber and/or received from the chamber, and may be connected to the pump with aid of a fluid connector 421. Optionally, a filter 424 may be provided that may filter the liquid flowing to and/or from the chamber. The filter may be connected to the pump with aid of a fluid connector 423 and/or may be connected to an interior of the chamber with aid of a fluid connector 425.

A temperature control system may be provided that may control a temperature of one or more elements of a component protection apparatus. The temperature control system may include a pump 432 that may control flow of liquid to and/or from the chamber. A heating element 430 may heat liquid that may be provided to the chamber and/or received from the chamber, and may be connected to the pump with aid of a fluid connector 431. The heating element may be connected to the interior of the chamber with aid of a fluid connector 435. A cooling element 434 may cool liquid that may be provided to the chamber and/or received from the chamber, and may be connected to the pump with aid of a fluid connector 433. The cooling element may be connected to the interior of the chamber with aid of a fluid connector 437.

The component protection apparatus, which may optionally include the temperature control system and/or the pressure adjustment system, may include any of the features and/or characteristics described elsewhere herein in various embodiments. Variations to the characteristics and/or configurations provided herein may be provided, in accordance with descriptions provided elsewhere herein.

The component protection apparatus 400 may include a chamber 402. The chamber may be a spherical chamber, or any type of rounded chamber. The chamber may be formed of a material that may be fluid tight. In some instances, the chamber may be formed of multiple pieces that may be connected to one another. For instance, the chamber may be formed from two semi-spheres, three one-thirds of a sphere, four quarters of a sphere, or so forth. The pieces of the chamber may be connected to one another permanently. The pieces of the chamber may be glued together with aid of an adhesive, soldered together, melted together, or permanently attached in any other manner. Alternatively, the pieces of the chamber may be connected to one another in a removable manner. For instance, the pieces of the chamber may be connected with aid of one or more mechanical fasteners, interlocking pieces, gaskets, clamps, or any other components. Removably attaching the pieces may allow a user to disassemble the component protection apparatus and access the component as needed. The chamber may be fluid-tight. In some instances, the pieces, whether permanently or removably attached, may be configured to provide a fluid-tight chamber. The chamber may remain fluid-tight, even when the fluid within is subjected to high pressures (e.g., 100 kPa, 200 kPa, 300 kPa, 500 kPa, 750 kPa, 1 MPa, 1.5 MPa, 2 MPa, 3 MPa, or 5 MPa). Optionally, a liquid may be provided within the chamber that may reduce a force of impact experienced by the component. The liquid may be prevented from leaking outside the fluid-tight chamber. The liquid may be an electric insulator. For instance, the liquid may be an oil or any other type of liquid described elsewhere herein.

An outer container 408 may be provided outside the chamber. The outer container may be a spherical container, or any type of rounded container. The outer container may have the same shape as the chamber. The outer container may be larger than the chamber. The chamber may be substantially positioned concentrically relative to the outer container. The chamber may not directly contact the outer container. The chamber may be suspended within the outer container with aid of one or dampeners 412. The dampeners may be springs or any other type of dampener as described elsewhere herein. The dampeners may be connected to an outer surface of the chamber and an inner surface of the outer container. The dampeners may be hooked onto a seam or protrusion on an outer surface of the chamber. The dampeners may be hooked onto a protrusion and/or seam within an inner surface of the outer container. Any other type of connection may be formed.

The outer container may be formed of a material that may be fluid tight. In some instances, the outer container may be formed of multiple pieces that may be connected to one another. For instance, the chamber may be formed from two semi-spheres, three one-thirds of a sphere, four quarters of a sphere, or so forth. The pieces of the chamber may be connected to one another permanently, in any manner, which may include those described elsewhere herein. Alternatively, the pieces of the chamber may be connected to one another in a removable manner, which may include any manner described elsewhere herein. The outer container may be fluid-tight. The outer container may remain fluid-tight, even when the fluid within is subjected to high pressures (e.g., 100 kPa, 200 kPa, 300 kPa, 500 kPa, 750 kPa, 1 MPa, 1.5 MPa, 2 MPa, 3 MPa, or 5 MPa). Optionally, a gas may be provided within the outer container. The gas may be prevented from leaking outside the outer container. The gas may be provided in the space between the chamber and the outer container. Fluid may be any type of gas or liquid described elsewhere herein.

An inner container 410 may be provided within the chamber. The inner container may be a spherical container, or any type of rounded container. The inner container may be a silicone ball. The inner container may have the same shape as the chamber. The inner container may be smaller than the chamber. The inner container may be substantially positioned concentrically relative to the chamber. The chamber may not directly contact the inner container. The inner container may be suspended within the chamber with aid of one or dampeners 414. The dampeners may be pillars, such as elastomeric (e.g., silicone) pillars, or any other type of dampener as described elsewhere herein. The dampeners may be connected to an outer surface of the inner container and an inner surface of the chamber. The dampeners may be formed integrally from a surface of the inner container, or may be attached to the outer surface of the inner container (e.g., with aid of an adhesive). The dampeners may be formed integrally from an inner surface of the chamber, or may be attached to the inner surface of the chamber (e.g., with aid of an adhesive). Alternatively, the dampeners may move freely with respect to the inner surface of the chamber, or the outer surface of the inner container. Any other type of connection may be formed.

The inner container may be formed of an elastomeric or flexible material, such as silicone. The inner container may enclose a component to be protected, such as an electronic component. The inner container may or may not fluidically isolate the component from the space outside the inner container. In some instances, the outer container may be formed of multiple pieces that may be connected to one another. The pieces of the chamber may be connected to one another permanently, in any manner, which may include those described elsewhere herein. Alternatively, the pieces of the chamber may be connected to one another in a removable manner, which may include any manner described elsewhere herein. Optionally, a fluid may be provided within the outer container. The fluid may be the same fluid as within the chamber. The fluid within the chamber may be able to pass to the component within the inner container. One or more openings may permit the fluid to pass to the component. The liquid within the chamber may be an electric insulator so that even if it contacts an electronic component, it does not cause any electrical short or problems. Alternatively, the inner container may prevent the liquid within the chamber from contacting the fluid. The inner container may fluidically isolate fluid within the inner container and fluid outside the inner container. This may permit the liquid within the chamber to be any type of liquid, which may include a liquid that may conduct electricity, since it will not contact the component. The inner container may include a fluid (e.g., liquid or gas) within, which may contact the component. The fluid within the inner container may be an electric insulator.

A pressure adjustment system may include a pump 422 that may control flow of liquid to and/or from the chamber. Any description herein of a pump may apply to any other pressure adjustment element as described elsewhere herein may be used to control flow of liquid to and/or from the chamber. A single pump may be used to both pump fluid to and from the chamber. Alternatively, a first pump may pump fluid to the chamber while a second pump may pump fluid from the chamber. The pump may be fluidically connected to an interior of the chamber via one or more fluid connectors. The fluid connector may be a fluid conduit, such as one or more pipes, channels, passages, or any other connector that may fluidically connect the pump to the interior of the chamber. The fluid connector may be an enclosed fluid connector that may prevent the fluid from being exposed to ambient air. The fluid connector may be able to tolerate fluids (e.g., liquids, gases) of high pressure, such as any of the pressure values described elsewhere herein. The fluid connectors may not leak even when exposed to high pressures, such as any of the pressure values described elsewhere herein. When a pump is not in operation, the fluid within the chamber may remain at substantially the same pressure.

A reservoir 420 may store liquid that may be provided to the chamber and/or received from the chamber. The reservoir may have any characteristics or elements as described elsewhere herein. The reservoir may store fluid (e.g., the liquid) outside the outer container and/or chamber. For instance, the reservoir may be formed from a rigid material or flexible material. The pressure of the fluid within the reservoir may vary as fluid is flowed to or from the chamber. Optionally, the volume of the reservoir may remain the same. Alternatively, the pressure of the fluid within the reservoir may remain substantially the same as fluid is flowed to or from the chamber, while optionally the volume of the reservoir may change. The reservoir may be supported on a shared substrate 440 with the pump. The shared substrate may optionally also support the outer container 408.

The reservoir 420 may be connected to the pump 422 with aid of one or more fluid connectors 421. The fluid connector may be a fluid conduit, such as one or more pipes, channels, passages, or any other connector that may fluidically connect the reservoir to the pump. The fluid connector may be an enclosed fluid connector that may prevent the fluid from being exposed to ambient air. The fluid connector may be able to tolerate fluids (e.g., liquids, gases) of high pressure, such as any of the pressure values described elsewhere herein. The fluid connectors may not leak even when exposed to high pressures, such as any of the pressure values described elsewhere herein. When a pump is not in operation, the fluid within the fluid connector may not pass through the pump. The pump in the fluid connector and/or reservoir may remain within the fluid connector and/or reservoir. There may or may not be additional gating elements between a reservoir and a pump. For instance, one or more valves may or may not be provided between the reservoir and pump. Alternatively, the fluid flow may remain open between the reservoir and the pump.

In some embodiments, when a pump is not in operation, the pressure of the fluid within the reservoir may remain the same. When the pump is not in operation, the fluid within the reservoir may not be in fluid communication with a fluid within the chamber.

Optionally, a filter 424 may be provided that may filter the liquid flowing to and/or from the chamber. The filter may remove particulates that may be found in the liquid. The filter may affect the flow of the liquid. The filter may affect flow dynamics, such as turbulence, of the liquid. The filter may be located between the pump and the chamber. Fluid may flow through the pump, through the filter, and into the chamber, or from the chamber, through the filter, and then through the pump. Alternatively, the filter may be located between the pump and the fluid reservoir. Fluid may flow from the reservoir, through the filter, and through the pump, into the chamber, or from the chamber, through the pump, through the filter, and into the reservoir. Any number or types of filters may be provided. For instances, filters may be provided on other side of the pump.

The filter 424 may be connected to the pump with aid of a fluid connector. For instance, a fluid connector 423 may connect the filter and a pump. The filter may be connected to the chamber with aid of a fluid connector. For instance, a fluid connector 425 may connect the filter and the interior of a chamber. Any of the fluid connectors provided herein may be a fluid conduit, such as one or more pipes, channels, passages, or any other connector that may fluidically connect the pipe to the interior of the chamber. The fluid connector may be an enclosed fluid connector that may prevent the fluid from being exposed to ambient air. The fluid connector may be able to tolerate fluids (e.g., liquids, gases) of high pressure, such as any of the pressure values described elsewhere herein. The fluid connectors may not leak even when exposed to high pressures, such as any of the pressure values described elsewhere herein. There may or may not be additional gating elements between a filter and a pump. For instance, one or more valves may or may not be provided between the filter and pump. Alternatively, the fluid flow may remain open between the filter to the pump.

The various fluid connectors fluidically connecting any of the various components described herein within the pressure adjustment system may be of the same type or may be of different types. The fluid connectors may all be pipes. The fluid connectors may have the same characteristics (e.g., materials, diameters, lengths, pressure tolerances, etc.) or may have varying characteristics (e.g., varying materials, diameters, lengths, pressure tolerances, etc.).

A temperature control system may include a pump 432 that may control flow of liquid to and/or from the chamber. Any description herein of a pump may apply to any other pressure adjustment element as described elsewhere herein may be used to control flow of liquid to and/or from the chamber. A single pump may be used to both pump fluid to and from the chamber. A single pump may be used to pump fluid that is heated and to pump fluid that is cooled. The single pump may pump fluid from the chamber to a heating element and then pump the heated fluid to the chamber when an instruction is received to raise the temperature of the fluid within the chamber, and the pump may pump fluid from the chamber to a cooling element and then pump the cooled fluid to the chamber when an instruction is received to lower the temperature of the fluid within the chamber. Alternatively, a first pump may pump heated fluid while a second pump may pump cooled fluid. The first pump and second pumps may operate in parallel and independently of one another. The first and second pumps may or may not be capable of operating simultaneously. The pump may be fluidically connected to an interior of the chamber via one or more fluid connectors. The fluid connector may be a fluid conduit, such as one or more pipes, channels, passages, or any other connector that may fluidically connect the pump to the interior of the chamber. The fluid connector may be an enclosed fluid connector that may prevent the fluid from being exposed to ambient air. The fluid connector may be able to tolerate fluids (e.g., liquids, gases) of high pressure, such as any of the pressure values described elsewhere herein. The fluid connectors may not leak even when exposed to high pressures, such as any of the pressure values described elsewhere herein. When a pump is not in operation, the fluid within the chamber may remain at substantially the same pressure.

A heating element 430 may heat liquid that may be provided to the chamber and/or received from the chamber, and may be connected to the pump with aid of a fluid connector 431. The heating element may be connected to the interior of the chamber with aid of a fluid connector 435. A cooling element 434 may cool liquid that may be provided to the chamber and/or received from the chamber, and may be connected to the pump with aid of a fluid connector 433. The cooling element may be connected to the interior of the chamber with aid of a fluid connector 437. A fluid connector may have any characteristic of any of the various fluid connectors as described elsewhere herein. In some embodiments, a fluid flow loop may be provided where fluid may flow from the chamber to the heating element, then from the heating element to the pump, from the pump to the cooling element, and then from the cooling element back to the chamber. Alternatively, the fluid flow loop may have fluid flow from the chamber to the cooling element, then from the cooling element to the pump, from the pump to the heating element, and then from the heating element back to the chamber. In some embodiments, only one of the heating or cooling elements is turned on at the same time. In some embodiments, there may be moments when neither the heating element, nor the cooling element is turned on. The orders of the heating element, cooling element, and pump may be adjusted in any combination.

As described elsewhere herein, in alternative embodiments, a single temperature control element capable of both heating and cooling may be provided rather than separate heating and cooling elements. The temperature control element may be provided between the pump and the chamber. Alternatively, the pump may be provided between the temperature control element and the chamber. In some instances, a fluid flow loop may be provided where fluid may flow from the chamber to the temperature control element, then from the temperature control element to the pump, and from the pump back to the chamber. Alternatively, the fluid flow loop may have fluid flow from the chamber to the pump, then from the pump to the temperature control element, and from the temperature control element back to the chamber.

The various fluid connectors fluidically connecting any of the various components described herein within the temperature control system may be of the same type or may be of different types. The fluid connectors may all be pipes. The fluid connectors may have the same characteristics (e.g., materials, diameters, lengths, pressure tolerances, etc.) or may have varying characteristics (e.g., varying materials, diameters, lengths, pressure tolerances, etc.).

The pressure adjustment system and the temperature control system may operate in parallel of one another. They may operate independently of one another. The pressure adjustment system may be modifying a pressure while the temperature control system is modifying a temperature or maintaining a temperature. Similarly, the pressure adjustment system may be maintaining a pressure while the temperature control system is modifying a temperature or maintaining a temperature. The pumps of the pressure adjustment system and the temperature control system may operate independently of one another. The pumps may be the same type of pump or different types of pumps. The pumps may share one or more characteristics (e.g., type, size, maximum/minimum flow rates, etc.) and/or may have one or more different characteristics.

As previously illustrated, the pressure adjustment system and temperature control system may utilize separate fluid flow systems. Alternatively, the pressure adjustment system and the temperature control system may utilize the same fluid flow systems. For instance, a heating element and/or cooling element may be provided in the fluid flow path of a pressure adjustment system. However, such arrangements may cause the operation of the pressure adjustment system and the temperature control system to be dependent on one another to some respect.

Figure 5:
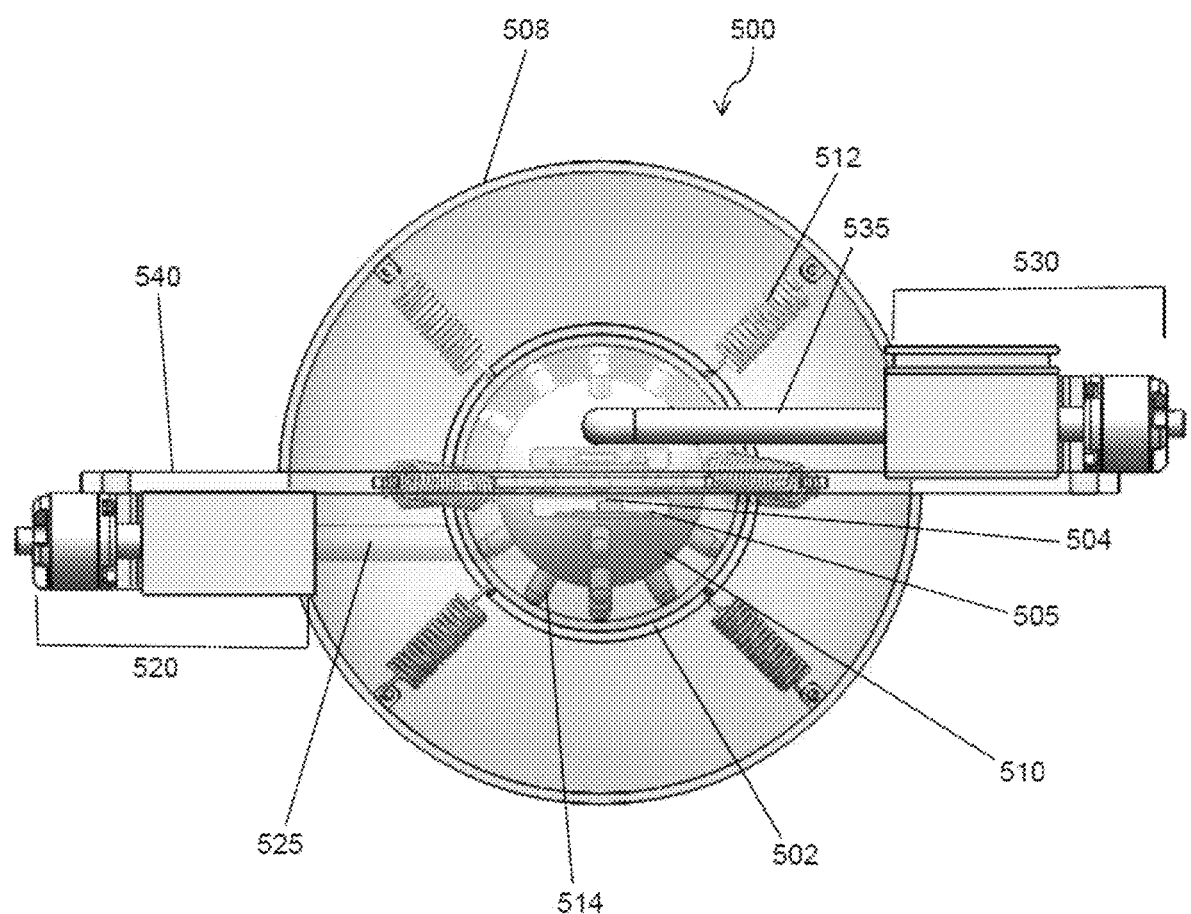
FIG. 5 shows an additional view of a component protection apparatus that reduces effects of external forces on the component in accordance with embodiments of the disclosure.

FIG. 5 shows an additional view of a component protection apparatus that reduces effects of external forces on the component in accordance with embodiments of the disclosure. For instance, a side view may be provided. The component protection apparatus 500 may include a chamber 502. Optionally, a liquid may be provided within the chamber that may reduce a force of impact experienced by the component. An outer container 508 may be provided outside the chamber. An inner container 510 may be provided within the chamber. The inner container may optionally enclose and/or support a component 504 that is to be protected. The component may be within one or more cavities 505 within the inner container. One or more dampeners 512 may be provided between the outer container and the chamber. One or more dampeners 514 may be provided between the chamber and the inner container. The arrangement of the chamber, containers, and/or components described herein may have any characteristic as described elsewhere herein.

In one embodiment, the component 504 may be supported within one or more cavities 505 of the inner container 510. For instance, the inner container may be a substantially solid silicone ball. The one or more cavities may be carved into the silicone ball. The component may be within the cavities. The cavities may or may not permit liquid from within the chamber to directly contact the component. In some instances, openings may be provided to connect the cavities to the liquid. The openings may be sufficiently large to remove or insert the component through the opening. In some instances, multiple pieces of a component may be provided. The multiple pieces of the component may be within the same cavity or within different cavities. For instance, a single cavity or multiple cavities may support a single circuit board or multiple circuit boards. The circuit boards may optionally include chips and/or traces built thereon. Any other characteristics or elements of an inner container and/or components as described elsewhere herein may be incorporated.

A pressure adjustment system 520 may be provided that may control a pressure of the liquid within the chamber. The pressure adjustment system may affect a pressure of the liquid within the chamber. The pressure adjustment system may be capable of increasing, decreasing, and/or maintaining the pressure of the liquid within the chamber. The pressure adjustment system may include one or more elements, features, or characteristics as described elsewhere herein. In some instances, the pressure adjustment system may be connected to the chamber with aid of a single fluid connector 525.

A temperature control system 530 may be provided that may control a temperature of one or more elements of a component protection apparatus. The temperature control system may affect a temperature of the liquid within the chamber. The temperature control system may be capable of increasing, decreasing, and/or maintaining the temperature of the liquid within the chamber. The temperature control system may include one or more elements, features, or characteristics as described elsewhere herein. In some instances, the temperature control system may be connected to the chamber with aid of a multiple fluid connectors (e.g., fluid connector 535 and another fluid connector (not shown) that may permit a fluid loop to be formed).

In some embodiments, a component protection substrate 540 or support may be provided. The component protection substrate may support the outer container, the pressure adjustment system, and/or the temperature control system. The component protection substrate may support may be a single piece or formed of multiple pieces. The component protection substrate may be formed form a separate piece from the outer container. Alternatively, the outer container may be integrally formed with the component protection substrate. For instance, the outer container may be molded in a rounded shape from a flat component protection substrate. The component protection substrate may have any shape. For instance, the component protection substrate may have a substantially planar structure. The outer container may extend both above and below the substrate. The pressure adjustment system may be substantially above the plane of the component protection substrate, or below the plane of the component protection substrate. The temperature control system may be substantially above the plane of the component protection substrate, or below the plane of the component protection substrate. In some instances, the pressure adjustment system and the temperature control system may be on the same side of the plane of the component protection substrate (e.g., both above, or both below). Alternatively, the pressure adjustment system and the temperature control system may be on opposing sides of the plane of the component protection substrate (e.g., one above, one below).

The component protection substrate may have any other configuration. The component protection substrate may include a substantially solid block, or three dimensional shape or frame that may encompass one or more portions of the component protection apparatus. The component protection substrate may keep the positions of the outer container, the pressure adjustment system and/or the temperature control system substantially static relative to one another. Alternatively, the component protection substrate may allow some movement between the outer container, the pressure adjustment system and/or the temperature control system. The component protection substrate may be formed from a rigid material. Alternatively, the component protection substrate may be formed from a flexible material, such as an elastomeric material. The component protection substrate may or may not have a vibration dampening effect. The component protection substrate may or may not reduce a force of impact on the component protection system. The component protection substrate may contact or be supported by another component of a movable object of which the component protection substrate is on-board. Other components of the component protection substrate may or may not directly contact portions of the movable object.

Figure 6:
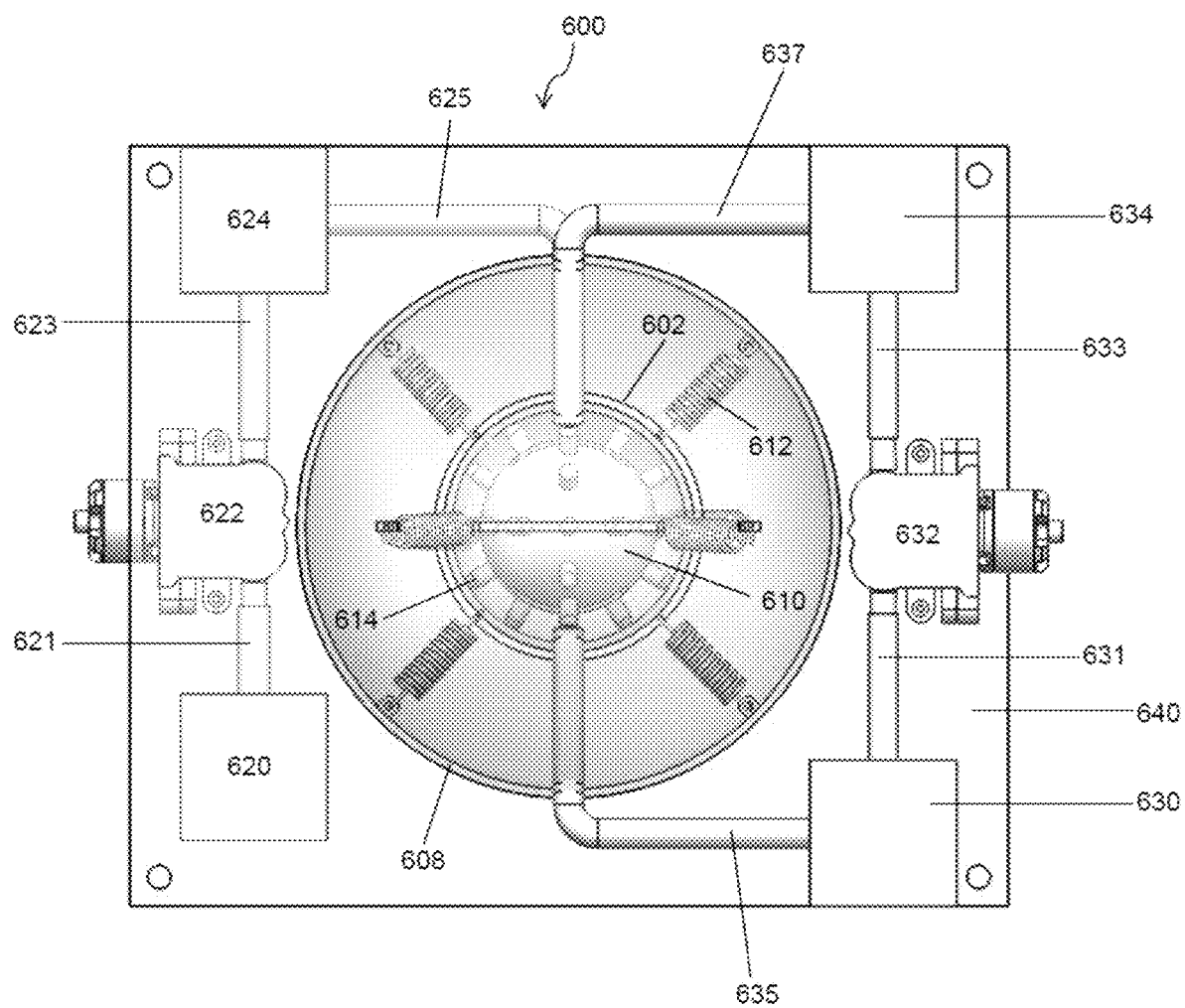
FIG. 6 provides a further view of a component protection apparatus that reduces effects of external forces on the component in accordance with embodiments of the disclosure.

FIG. 6 provides a further view of a component protection apparatus that reduces effects of external forces on the component in accordance with embodiments of the disclosure. For instance, an upper view may be provided. The component protection apparatus 600 may include a chamber 602. Optionally, a liquid may be provided within the chamber that may reduce a force of impact experienced by the component. An outer container 608 may be provided outside the chamber. An inner container 610 may be provided within the chamber. One or more dampeners 612 may be provided between the outer container and the chamber. One or more dampeners 614 may be provided between the chamber and the inner container. The arrangement of the chamber, containers, and/or components described herein may have any characteristic as described elsewhere herein.

A pressure adjustment system may be provided that may control a pressure of the liquid within the chamber. The pressure adjustment system may include a pump 622 that may control flow of liquid to and/or from the chamber. A reservoir 620 may store liquid that may be provided to the chamber and/or received from the chamber, and may be connected to the pump with aid of a fluid connector 621. Optionally, a filter 624 may be provided that may filter the liquid flowing to and/or from the chamber. The filter may be connected to the pump with aid of a fluid connector 623 and/or may be connected to an interior of the chamber with aid of a fluid connector 625. The pressure adjustment system may include one or more elements, features, or characteristics as described elsewhere herein.

The pressure adjustment system may be connected to the chamber with aid of a fluid connector 625. In some instances, a single fluid connector may connect the pressure adjustment system with the interior of the chamber. The single fluid connector may allow fluid to flow in both directions at different points in time. For instance, when increasing a pressure in the chamber, the fluid may flow toward the chamber. When decreasing the pressure within the chamber, the fluid may flow in the opposite direction in the fluid connector away from the chamber. In alternative embodiments of the disclosure, separate fluid connectors may be provided for pressure increase and pressure decrease.

The fluid connector may connect a component outside the outer container and may traverse the interior of the outer container, to reach the chamber. The fluid connector may or may not move relative to the outer container. In some instances, the chamber may move relative to the outer container due to vibration or impact. The fluid connector may permit this flexible motion of the chamber relative to the outer container. The fluid connector may or may not have a dampening feature. In some instances, the fluid connector may move relative to the outer container to permit this relative motion.

A temperature control system may be provided that may control a temperature of one or more elements of a component protection apparatus. The temperature control system may include a pump 632 that may control flow of liquid to and/or from the chamber. A heating element 630 may heat liquid that may be provided to the chamber and/or received from the chamber, and may be connected to the pump with aid of a fluid connector 631. The heating element may be connected to the interior of the chamber with aid of a fluid connector 635. A cooling element 634 may cool liquid that may be provided to the chamber and/or received from the chamber, and may be connected to the pump with aid of a fluid connector 633. The cooling element may be connected to the interior of the chamber with aid of a fluid connector 637. The temperature adjustment system may include one or more elements, features, or characteristics as described elsewhere herein.

The temperature system may be connected to the chamber with aid of multiple fluid connectors 635, 637. The multiple fluid connectors may enable a fluid loop to be formed. The fluid loop may enable the circulation of fluid without substantially altering the pressure within the chamber. In some embodiments, each fluid connector may allow fluid to flow in a single direction at a point in time. For instance, a first fluid connector may allow fluid to flow away from the chamber while the second fluid connector allows the fluid to flow into the chamber. Such fluid flow may occur simultaneously in parallel. In some instances, the fluid flow rates may be substantially the same to maintain the pressure within the chamber.

The fluid connectors may connect a component outside the outer container and may traverse the interior of the outer container, to reach the chamber. The fluid connectors may or may not move relative to the outer container. In some instances, the chamber may move relative to the outer container due to vibration or impact. The fluid connectors may permit this flexible motion of the chamber relative to the outer container. The fluid connectors may or may not have a dampening feature. In some instances, the fluid connectors may move relative to the outer container to permit this relative motion.

Fluid tight connections may be provided between the various fluid connectors and the outer container. The fluid tight connections may allow the fluid connectors to move relative to the outer container while allowing fluid (e.g., gaseous or liquid fluid) within the outer container from leaving the outer container. Alternatively, fluid tight connections are not needed, and fluid within the outer container may be allowed to leave the outer container, or slightly leak out of the outer container. When a gaseous fluid, such as air, is within the inner container, fluid may be allowed to freely leave the outer container and/or enter the outer container.

In some embodiments, a component protection substrate 640 or support may be provided. The component protection substrate may have one or more characteristics or elements as described elsewhere herein.

Figure 7:
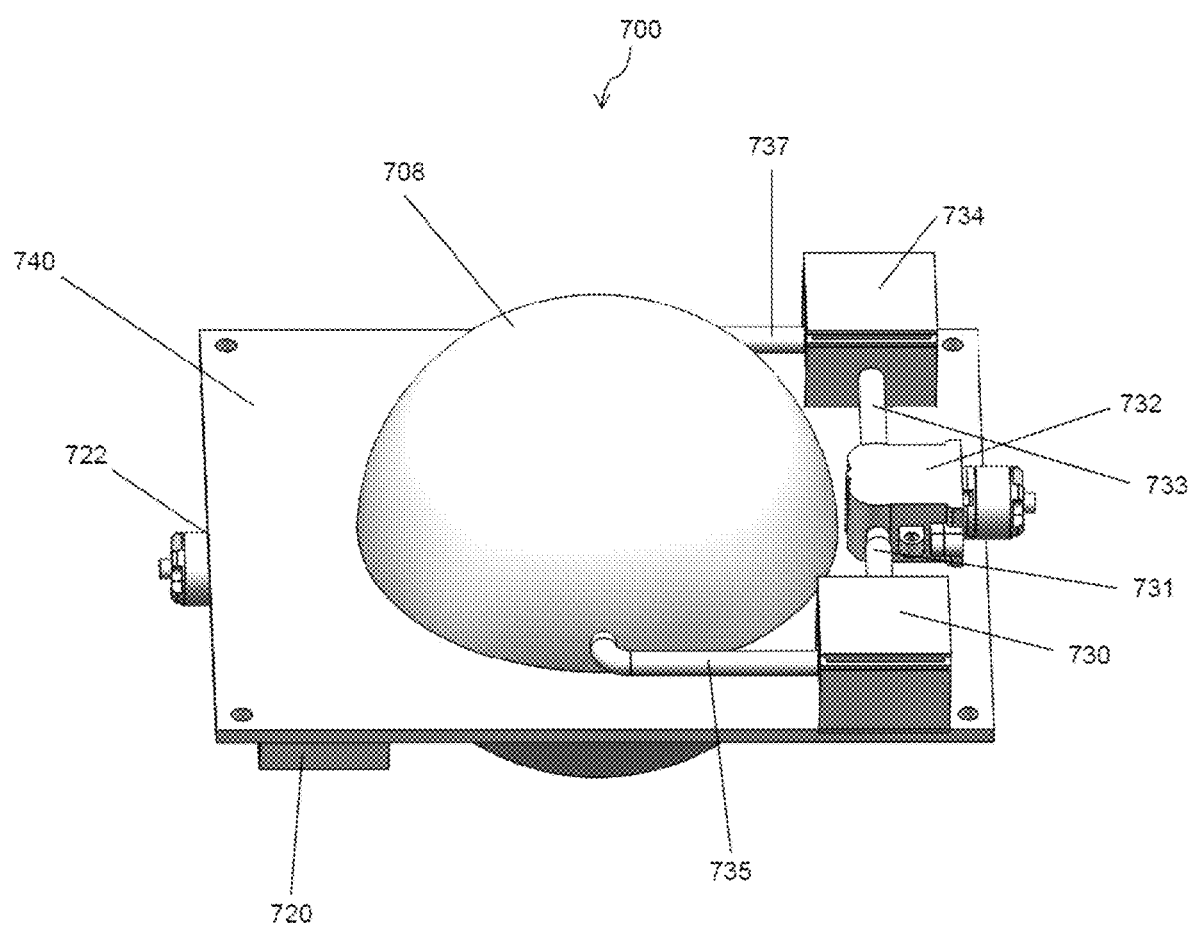
FIG. 7 provides an external view of a component protection apparatus that reduces effects of external forces on the component in accordance with embodiments of the disclosure.

FIG. 7 provides an external view of a component protection apparatus that reduces effects of external forces on the component in accordance with embodiments of the disclosure. The component protection apparatus 700 may include an outer container 708. The outer container may be supported by a component protection substrate 740.

A pressure adjustment system may be provided that may control a pressure of the liquid within the chamber. The pressure adjustment system may include a pump 722 that may control flow of liquid to and/or from the chamber. A reservoir 720 may store liquid that may be provided to the chamber and/or received from the chamber, and may be connected to the pump with aid of a fluid connector. Optionally, a filter may be provided that may filter the liquid flowing to and/or from the chamber. The filter, pump, and/or reservoir may be connected to a chamber within the outer container with aid of one or more fluid connectors.

A temperature control system may be provided that may control a temperature of one or more elements of a component protection apparatus. The temperature control system may include a pump 732 that may control flow of liquid to and/or from a chamber within the outer container. A heating element 730 may heat liquid that may be provided to the chamber and/or received from the chamber, and may be connected to the pump with aid of a fluid connector 731. The heating element may be connected to the interior of the chamber with aid of a fluid connector 735. A cooling element 734 may cool liquid that may be provided to the chamber and/or received from the chamber, and may be connected to the pump with aid of a fluid connector 733. The cooling element may be connected to the interior of the chamber with aid of a fluid connector 737.

The outer container may be supported on a component protection substrate. The component protection substrate may bear the weight of the outer container. The outer container may have a fixed position relative to the component protection substrate. The outer container may optionally have a spherical shape or other type of rounded shape. In some instances, a first portion of a rounded shape may extend above the component protection substrate and a second portion of a rounded shape may extend below the component protection substrate. The outer container may be a separate piece from the component protection substrate or may be integrally formed with the component protection substrate. In some instances, the outer container may be attached with aid of an adhesive, soldering, welding, melting, fasteners, mechanical features, magnets, or any other technique. In some instances, the outer container may have a first portion that is integrally formed with a first portion of the component protection substrate and a second portion that is integrally formed with a second portion of the component protection substrate. The first and second portions of the component protection substrate may be brought together to form the outer container. In some instances, gaskets or seals may be employed that may allow the outer container and/or the component protection substrate to form fluid-tight seals between one another.

One or more parts of the pressure adjustment system may be supported by the component protection substrate. The component protection substrate may bear the weight of the one or more parts of the pressure adjustment system. The one or more parts of the pressure adjustment system may be attached to one or more sides of the component protection substrate. In some instances, one or more parts of the pressure adjustment system may be attached to a single side of the component protection substrate. Optionally, the one or more parts of the pressure adjustment system may be integral to the component protection substrate. In some instances, the one or more parts of the pressure adjustment system may be permanently affixed or removably attached to the component protection apparatus.

One or more parts of the temperature control system may be supported by the component protection substrate. The component protection substrate may bear the weight of one or more parts of the temperature control system. The one or more parts of the temperature control system may be attached to one or more sides of the component protection substrate. In some instances, one or more parts of the temperature control system may be attached to a single side of the component protection substrate. Optionally, the one or more parts of the temperature control system may be integral to the component protection substrate. In some instances, the one or more parts of the temperature control system may be permanently affixed or removably attached to the component protection apparatus.

The component protection system may be provided on a movable object. The movable object may bear weight of the component protection system. The component protection substrate may be provided as a common support for one or more parts of the component protection system. In some instances, the component protection substrate may be attached to one or more other portion of the movable object. For instance, the component protection substrate may be fashioned to a piece or portion of the movable object.

Figure 8:
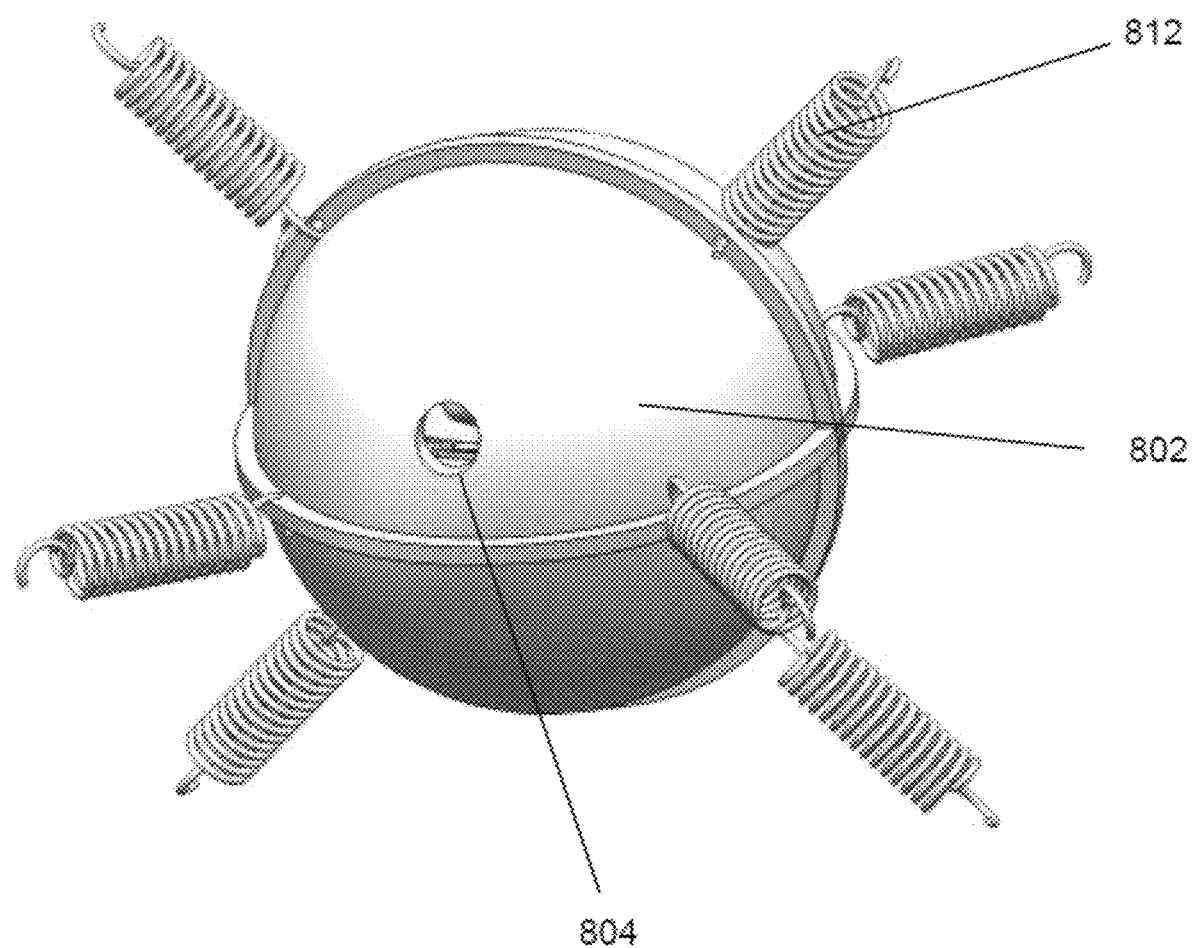
FIG. 8 shows a view of a chamber of a component protection apparatus in accordance with embodiments of the disclosure.

FIG. 8 shows a view of a chamber of a component protection apparatus in accordance with embodiments of the disclosure. A chamber 802 may be provided. The chamber may include an opening 804. The opening may permit a fluid, such as a liquid of any type described elsewhere herein, to enter and/or leave the chamber. Optionally, one or more dampeners 812 may be provided and connected to an exterior surface of the chamber.

The chamber may have a spherical shape or any other type of rounded shape. The chamber may optionally have a smooth internal or external surface. In some instances, one or more seams or protrusions may be provided. In some instances, the chamber may be formed from multiple parts, and the seams or protrusions may be provided where the parts of the chamber come together. The seam may provide a larger surface for the pieces of the chamber to come together. This may be useful when applying adhesives or any other type of connection. In some instances, gaskets or seals may be provided at the seams which may provide leakage of fluid from the chamber. Optionally, the seams or protrusions may provide points at which a dampener may be attached to the chamber. The chamber may be provided within an outer container, such as any type of outer container described elsewhere herein.

The chamber may include one or more holes. The holes may allow the fluid to enter or exit the chamber. The holes may be connected to one or more fluid connectors of a pressure adjustment system and/or a temperature control system. The holes may allow for fluid-tight connections with the fluid connectors. Fluid may be prevented from leaking out of the chamber at where the holes meet the fluid connectors.

One or more dampeners may be connected to the chamber. The dampeners may also be connected to an outer container. The dampeners may permit the chamber to move relative to the outer container. The dampeners may reduce the amount of force of impact experienced by the chamber relative to the outer container. In some instances, the dampeners may be springs. The dampeners may alternatively be any other type of dampener as described elsewhere herein.

Figure 9:
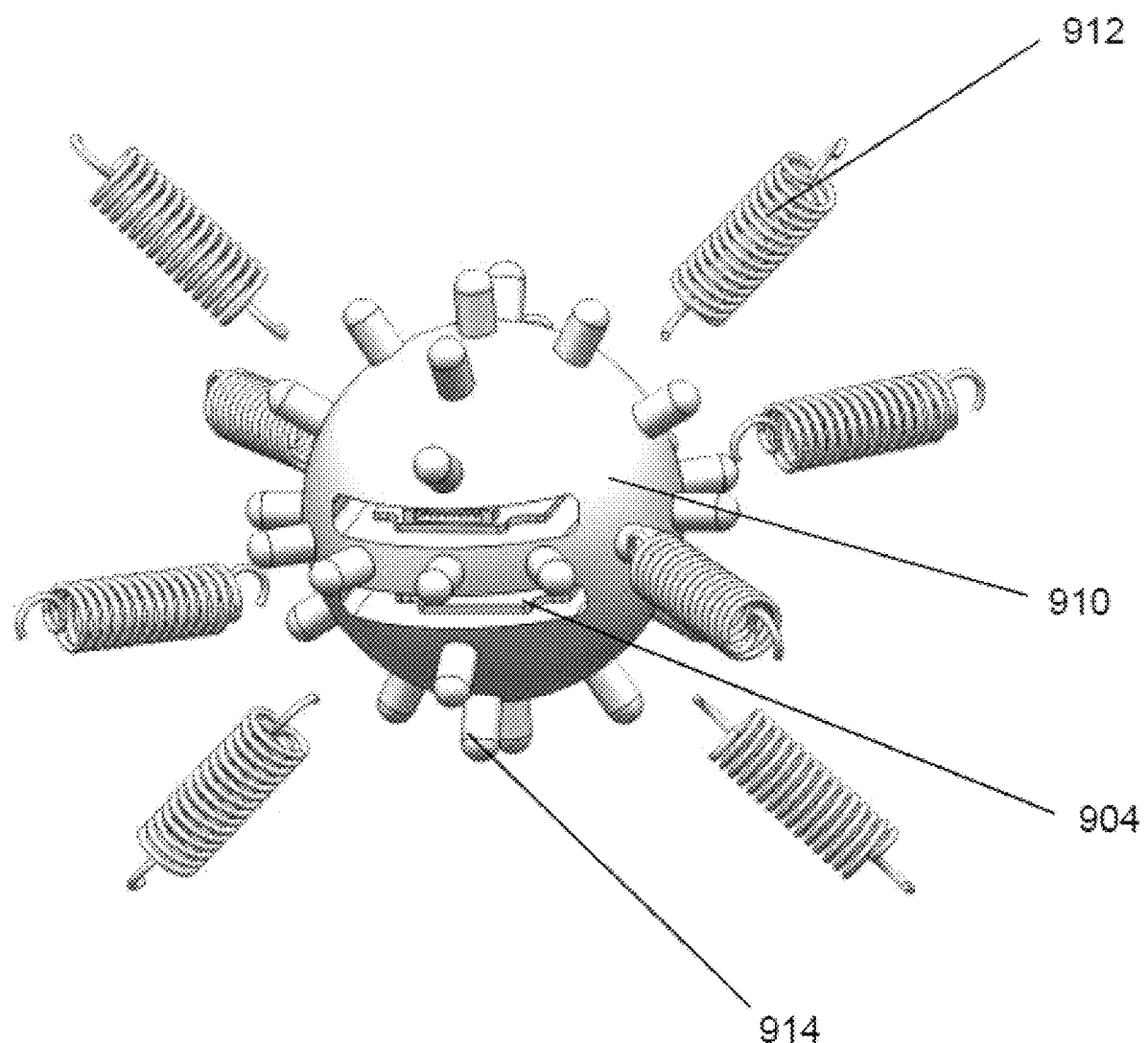
FIG. 9 shows a view of an inner container of a component protection apparatus in accordance with embodiments of the disclosure.

FIG. 9 shows a view of an inner container of a component protection apparatus in accordance with embodiments of the disclosure. An inner container 910 may be provided. The inner container may enclose one or more components 904. Optionally, one or more dampeners 914 may be provided on an exterior surface of the inner container. Additional layers of dampeners 912 may be provided. The additional layers of dampeners may optionally not directly connect to the inner container. The additional layers of dampeners may connect to another part of the apparatus that may be enclosing the inner container.

The inner container may have a spherical shape or any other type of rounded shape. The inner container may optionally have a smooth surface. The inner container may be provided within chamber, such as any type of chamber described elsewhere herein.

The inner container may support one or more components. The components may be electronic components. The components may have any characteristics as described elsewhere herein. The inner container may bear weight of the one or more components. A component may be within one or more cavities within the inner container. In some instances, the inner container may be a silicone ball. The interior of the cavities may or may not be fluidically isolated from an exterior of the inner container. Fluid directly outside the inner container may or may not be fluidically isolated from an exterior surface of the component.

One or more dampeners may be provided on the inner container. The dampeners may also be connected to a chamber. The dampeners may permit the inner container to move relative to the chamber. The dampeners (e.g., first set of dampeners) may reduce the amount of force of impact experienced by the inner container relative to the chamber. In some instances, the dampeners may be elastomeric pillars, such as silicone pillars. The dampeners may alternatively be any other type of dampener as described elsewhere herein. Additional dampeners (e.g., second set of dampeners) may be provided between the chamber and an outer container. The second set of dampeners may reduce the force by a greater amount than the first set of dampeners. Alternatively, the first set of dampeners may reduce the force by a greater amount than the first set of dampeners. In some instances, the relative degree of dampening may depend on a frequency of vibrations. For instance, in some embodiments, a first set of dampeners may more effectively dampen vibrations at a lower frequency than a second set of dampeners, while the second set of dampeners may more effectively dampen vibrations at a higher frequency than a first set of dampeners, or vice versa. Alternatively, regardless of frequency, the relative amounts of dampening may be similar.

Figure 10:
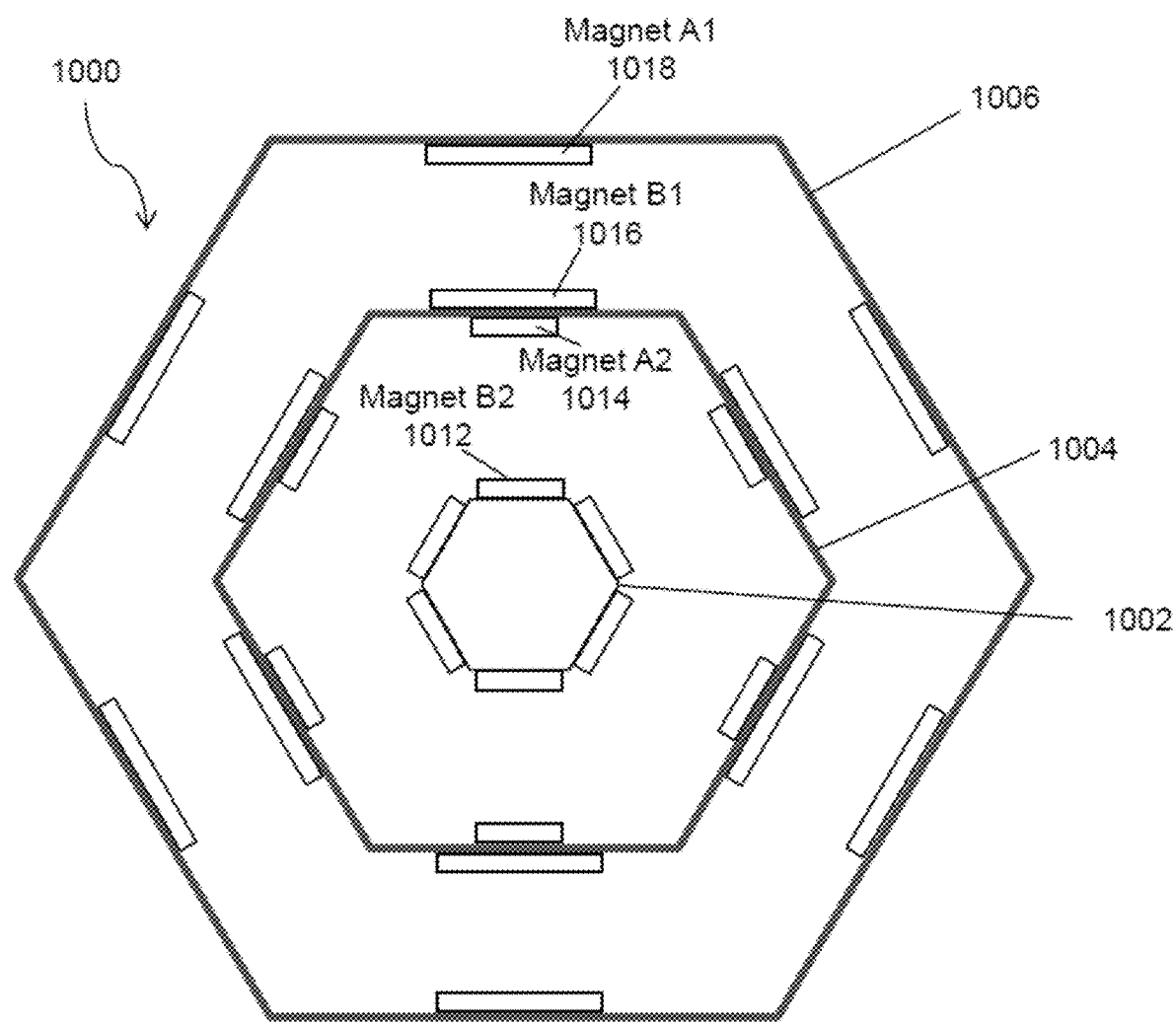
FIG. 10 shows an example of a dampening mechanism for a component protection apparatus in accordance with embodiments of the disclosure.

FIG. 10 shows an example of a dampening mechanism for a component protection apparatus in accordance with embodiments of the disclosure. In some embodiments, a dampening system for a component protection apparatus 1000 may employ the use of magnetic forces. In some instances, one or more layers of enclosure may be provided. For instance, an inner layer 1002, intermediary layer, 1004, and outer layer 1006 may be provided. Any description herein may apply to any number of layers. One or more layers of magnets supported by the layers may be provided. For instance, a first set of magnets 1012 may be supported on an inner layer (e.g., outer surface of the inner layer). A second set of magnets 1014 may be supported on an inner surface of an intermediary layer. A third set of magnets 1016 may be supported on an outer surface of the intermediary layer. A fourth set of magnets 1018 may be supported on by an outer layer (e.g., inner surface of the outer layer).

One or more layers of enclosure may be provided. An outer layer 1006 may include an intermediary layer 1004, which may enclose an inner layer 1002. The various layers may have any shape. In some instances, the layers may have a circular or other type of rounded cross-section. In some instances, the layers may have a polygonal cross-section (e.g., triangular, quadrilateral, pentagonal, hexagonal, octagonal, or any other type of polygonal cross-section). Each layer may have substantially the same shape of cross-section or different shapes. In some instances, the cross-sections of the layers may be substantially concentrically arranged. In one example, the sides of the polygons of the cross-sections may be substantially parallel to one another.

Magnets may be arranged on the layers to provide a dampening effect. For instance, a first set of magnets 1012 may be supported on an inner layer (e.g., outer surface of the inner layer). A second set of magnets 1014 may be supported on an inner surface of an intermediary layer. The first and second sets of magnets may have the same polarity so that they repel one another. For instance, they may both have a negative (−) pole, or they may both have a positive (+) pole. The repulsion may provide a dampening effect. The closer the layers are brought together, the greater the repulsion may be. In some instances, a single magnet may be provided on each side. Alternatively, any number or arrangement of magnets may be provided. The magnets may be disposed to allow for stable placement of the layers relative to one another. There may be little or no rotation of the layers relative to one another. Alternatively, some relative rotation may be permitted.

Optionally, a third set of magnets 1016 may be supported on an intermediary layer (e.g., outer surface of the intermediary layer). A fourth set of magnets 1018 may be supported on an outer layer (e.g., inner surface of the outer layer). The third and fourth sets of magnets may have the same polarity so that they repel one another. For instance, they may both have a negative (−) pole, or they may both have a positive (+) pole. The repulsion may provide a dampening effect. The closer the layers are brought together, the greater the repulsion may be. In some instances, a single magnet may be provided on each side. Alternatively, any number or arrangement of magnets may be provided. The magnets may be disposed to allow for stable placement of the layers relative to one another. There may be little or no rotation of the layers relative to one another. Alternatively, some relative rotation may be permitted.

The level of repulsion between the first set and second set of magnets may be the same or may be different from the level of repulsion between the third set and the fourth set of magnets. The strength of the magnets may be selected to provide the desired amount of repulsion. In some instances, greater repulsion may be provided between the first set and second set of magnets than the third set and fourth set of magnets. Alternatively, greater repulsion may be provided between the third set and fourth set of magnets.

In some instances, the second set of magnets and third set of magnets may both be supported on an intermediary layers. The second and third sets of magnets may be on opposing sides of the intermediary layer. The second and third sets of magnets may have different polarities so that they attract one another. For instance, the third set may have a negative (−) pole and the second set may have a positive (+) pole, or the second set may have a positive (+) pole and the third set may have a negative (−) pole. The second a third sets of magnets may attract one another through the intermediary layers.

The various magnets may be attached to their respective surfaces in any manner. For instance, they may be adhered to their respective surfaces. They may be inserted into one or more compartments, attached with fasteners, mechanical features, or any other manner, such as those described elsewhere herein.

Any of the dampeners described herein may have a static level of dampening or a variable level of dampening. The degree of dampening may be varied during use. A damping factor may be adjusted. In the case of magnets, the magnetic force may be changed to vary the damping factor during use. In some instances, electromagnets may be provided. A level of current may be altered during use, which may alter the magnetic force. When a greater degree of repulsion is provided between corresponding magnets, a greater dampening effect may be provided. In some instances, the damping factor may be adjusted in response to a signal from one or more sensors. The damping factor may be increased when a level of vibration increases. The damping factor may be decreased when a level of vibration decreases. The damping factor may be increased when an imminent impact, hit or collision is detected. Such sensor readings are described in greater detail elsewhere herein.

Figure 11:
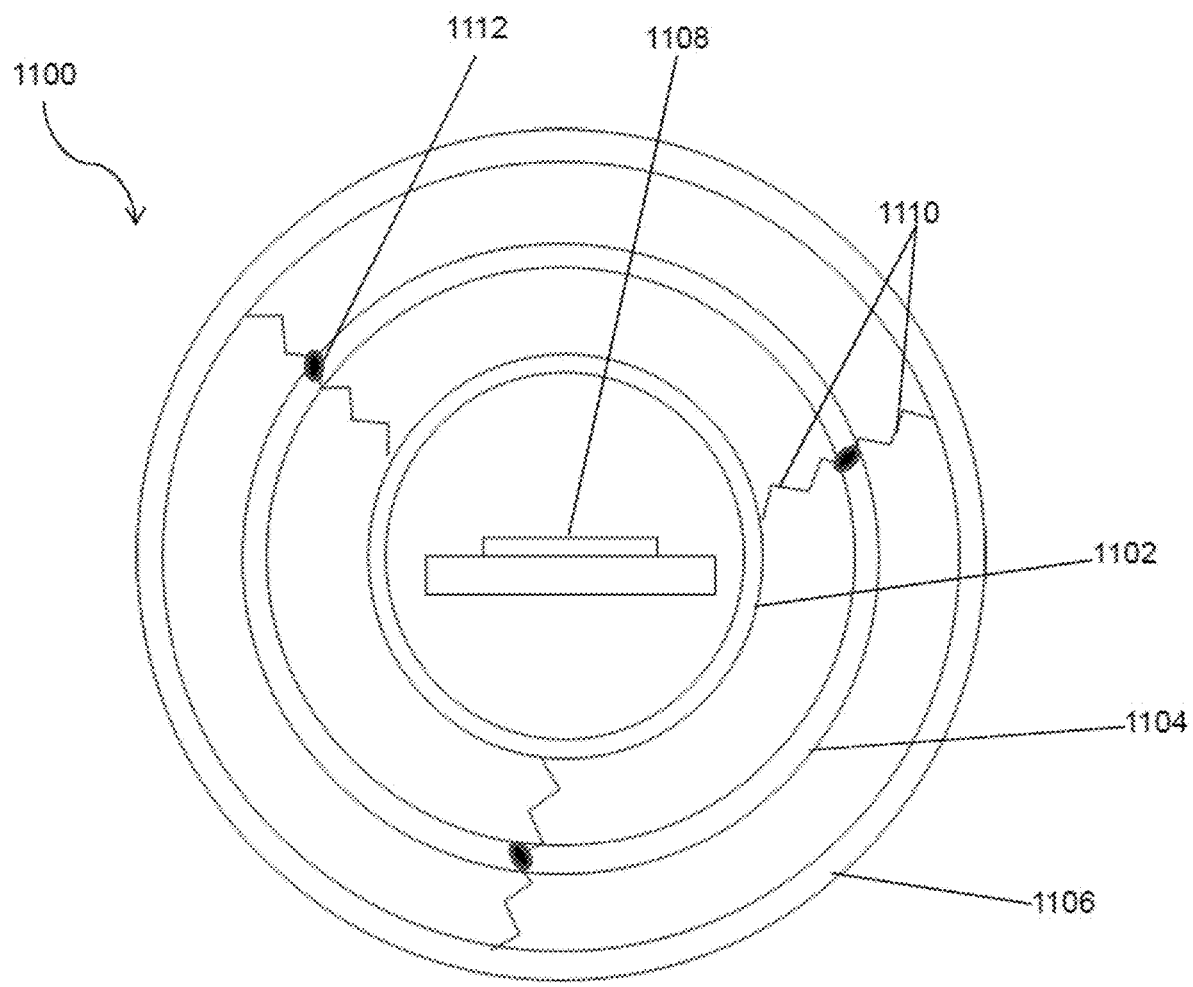
FIG. 11 shows an example of electrical connections for a component in a component protection apparatus in accordance with embodiments of the disclosure.

FIG. 11 shows an example of electrical connections for a component in a component protection apparatus in accordance with embodiments of the disclosure. A component protection apparatus 1100 may include one or more layers 1102, 1104 1106. A component 1108 may be enclosed by the one or more layers. Electrical connections 1110 may be provided between the component and one or more parts outside the component protection apparatus. In some instances, the electrical connections may be connected 1112 relative to the component protection apparatus.

Any number of layers of protection may be provided. The layers may be enclosed within one another. For instance an inner layer 1102 may be enclosed by an intermediary layer 1104. The intermediary layer may be enclosed by an outer layer 1106. The layers may have any characteristics as described elsewhere herein. The layers may enclose fluids or solids therein. The layers may or may not be fluid tight. For instance, the inner layer, intermediary layer, and/or outer layer may contain a liquid. The inner layer, intermediary layer, and/or outer layer may contain a gas. The inner layer, intermediary layer, and/or outer layer may contain a solid. The liquid, gas, and/or solid may be configured to reduce an amount of impact experienced by a layer enclosed by another layer. In some instances, one or more layers may enclose different fluids or solids than other layers. For instance, an outer layer may enclose a gas while an intermediary layer may enclose a liquid. An inner layer may but substantially solid and may optionally include one or more cavities that may have a liquid or gas.

The component 1108 may be enclosed by the one or more layers. The component may be an electronic component. The component may be powered by a power source external to the component protection assembly. For instance, the component protection apparatus may be on-board a movable object which may include a power source that may be used to power one or more portions of the movable object. The power source may also power the component. In some instances, the power source may comprise one or more batteries. Other types of power sources such as renewable energy (e.g., solar, wind) sources or fuel cells may be employed. In alternative embodiments, the component may have a local power source on-board the component protection apparatus. For instance, the local power source may be within one or more layers.

An electrical connection 1110 may be provided between the component 1108 and a power source. For instance, the electrical connection may traverse the component protection apparatus to connect the component within the component protection apparatus and a power source outside the component protection apparatus. The electrical connection may traverse one or more layers to connect the component with the power source outside the one or more layers. The electrical connection may pass through the one or more layers. The electrical connection may have a portion that is connected to a portion of a layer that may be electrically conductive, which may in turn be connected to another portion of the electrical connection. In some instances, the electrical connection may be configured to traverse a layer while permitting a layer to maintain a fluid-tight seal. The electrical connection may receive power from the power source and convey the power to the component. The component may be an electrical component that may operate using the power from the power source.

Optionally, the component may generate a signal that may be sent to one or more device outside the component protection apparatus. For instance, the signal may comprise an instruction that may affect an operation of the device outside the component protection apparatus. The signal may comprise data that may be collected or generated using the component. The device outside the component protection apparatus may optionally be part of a movable object that may support the component protection apparatus. For instance, the device may be a propulsion unit, a communication unit, a navigational unit, a sensor, a payload (e.g., camera, sensor, robotic arm, emitter), a carrier (e.g., a gimbal platform that may permit rotation and/or translation of the payload with respect to one, two or three axes), a power source, an actuator, a landing stand, an emitter (e.g., light, speaker, sprayer) or any other part of the movable object. The controller may be a flight controller that may affect flight of the movable object (e.g., by affecting one or more propulsion units of the movable object).

In some instances, the component may receive a signal that may be provided from outside the component protection apparatus. The signal may include data and/or instructions for the component. For instance feedback information from one or more of the devices may be provided to the component. In another example, sensed data from one or more sensors may be provided to the component.

The electrical connection may be used to transfer the signal from the component to the device outside the component protection apparatus and/or to receive the signal from device outside the component protection apparatus to the signal. In some instances, the same electrical connection may be used to power the component and to transfer the signal (e.g., to and/or from the component). Alternatively, different electrical connections or types of connections may be used to power the component and to transfer the signal (e.g., to and/or from the component). For instance, separate power lines and communication lines may be provided. In some instances separate incoming lines and outgoing lines may be provided. Optionally, data may be communicated to the component or from the component wirelessly. Any number of electrical connections may be provided between the component and one or more devices outside the component protection apparatus. For instance, one or more, two or more, three or more, four or more, five or more, six or more, eight or more, ten or more, fifteen or more, twenty or more, or thirty or more electrical connections may be formed between the component and one or more devices outside the component protection apparatus.

The electrical connections may have any form. For instance, the electrical connections may include one or more wires. The electrical connections may include insulated wires that may prevent the electricity from escaping the insulation of the wiring. The insulation may or may not be fluid tight. The insulation may include tubes, such as tubes from the electrically insulative materials. In one example, serpentine elastic tubes may be used. The tubes may also be pressure resistant. Alternatively, no insulation is required. The electrical connection may include wires of any gauges. In some embodiments, the wires may have sufficient thickness to form springs or other types of dampeners. The wires may be combined with or supported by dampeners. The electrical connections may form the dampeners themselves. The electrical connections may be provided separately from the dampeners. The dampeners may be formed of an electrically conductive material that may convey electrical energy and/or signals between the component and one or more devices outside the component.

In some embodiments, one or more connection points 1112 may be provided for the electrical connection to the component protection apparatus. For instance, the electrical connector may be attached using an adhesive, soldering, welding, melting, fasteners, mechanical features, magnets, or any other attachment technique. In one example, as illustrated, an electrical connection may be traverse between layers. The electrical connection may have a connection point at one or more of the layers, such as at an inner layer, intermediary layer, and/or outer layer. In some instances, the connection point may be provided at the component. For instance, the electrical connection may be soldered to the component.

Thus, a component protected by a component protection apparatus may be capable of interacting with one or more devices outside the component protection apparatus. The component protection apparatus may be powered by and/or engage in one-way or two-way communication with one or more devices outside the component protection apparatus. For instance, a flight controller may receive data useful for generating one or more flight control signals, and the flight control signals may be conveyed to the relevant portions of the movable object. Meanwhile, the component may be powered by a battery of the movable object. This may permit the component to be protected while remaining in operation. The component may be protected while a movable object is in operation (e.g., flight). The component may be protected from vibration or impact, and/or changing environmental conditions (e.g., temperature, or pressure), while receiving signals, sending signals, and/or receiving power.

Figure 12:
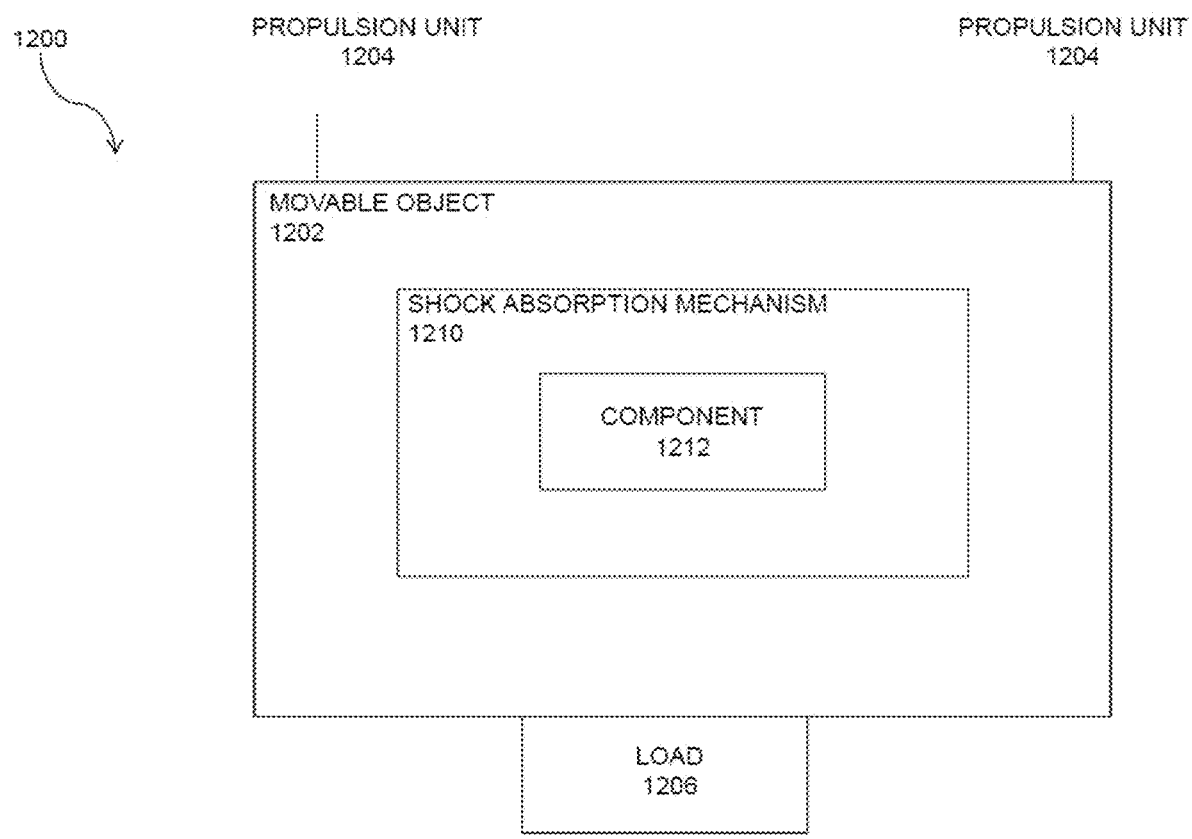
FIG. 12 shows an example of a movable object with a component protection apparatus in accordance with embodiments of the disclosure.

FIG. 12 shows an example of a movable object with a component protection apparatus in accordance with embodiments of the disclosure. A system 1200 may include a movable object 1202. The movable object may be any type of movable object as described elsewhere herein. For instance, the movable object may be an aerial vehicle, land-based vehicle, water-based vehicle, or space-based vehicle. The movable object may be an unmanned vehicle, such as an unmanned aerial vehicle (UAV). Further examples of movable objects may include, but are not limited to, unmanned land-based vehicles, ships, fighting robots, armed robots, construction machinery, or underwater robots. The movable object may be subjected to vibrations. Vibrations may occur in response to operation of one or more components of the movable objects or environmental interactions. The movable objects may experience a force of impact. An impact may arise from a collision, such as a collision with a moving or stationary object. An impact may arise from the movable object being hit, such as being hit by another object, such as a projectile. The movable object may be exposed to varying environmental conditions. Such change in environmental conditions may occur over a long period of time (e.g., seasons, weather), or may occur quickly (e.g., if the movable object is moving between different types of environments or changing altitude (e.g., in the air, or depth beneath water). Such factors may affect the operation of the movable object. It may be desirable to protect one or more components of the movable object from such conditions. For instance, electronic components, fragile components, sensors that require certain conditions to operate, and so forth may be protected. This may increase the accuracy and/or responsiveness of the movable object. This may also advantageously increase the life of the component, and the movable object.

The movable object 1202 may be self-propelled or may be propelled with aid of a living being or other object. In some instances, the movable object may be self-propelled with aid of one or more propulsion units 1204. In some instances, the propulsion units may include one or more rotor blades. The rotor blades may rotate with aid of one or more actuators. The rotor blades may generate lift for the movable object.

The movable object 1202 may optionally carry a load 1206. The load may include a payload, such as a camera. The camera may capture images while the movable object is in operation. The load may optionally include a carrier that may support the camera. The carrier may optionally permit movement of the payload relative to the movable object. For instance, the carrier may permit the payload to rotate about one, two or three axes relative to the movable object. The carrier may permit the payload to rotate about a pitch, roll, and/or yaw axis. The carrier may optionally permit the payload to translate relative to the movable object. Optionally the carrier may include a vibration dampener.

Any description herein of a movable object may also apply to a substantially stationary object. The substantially stationary object may be subject to vibrations. The substantially stationary objects may be subjected to hits or impacts. The substantially stationary object may experience various environmental conditions, such as widely varying temperatures, pressure, or precipitation. For example, a generator may have a component protection apparatus on-board to protect a controller of the generator. The generator may be subjected to vibrations during operations. In some instances, generators may be provided in outdoor environments and/or be subjected to varying environmental conditions.

The component protection apparatus 1210 (e.g., shock absorption mechanism) may be provided on-board the movable object. The weight of the component protection apparatus may be borne by the movable object. The component protection apparatus may reduce forces of impact experienced by a component 1212 within the component protection apparatus. The component protection apparatus may control a temperature experienced by the component within the component protection apparatus. This may be useful as the movable object may experience different environmental conditions and/or be subjected to vibrations, hits, collisions, or impacts.

The movable object may include a housing. The housing may enclose one or more parts of the movable object therein. The parts of the movable object may be completely or partially enclosed within the housing. The housing may or may not be fluid-tight. The housing may be formed from a single integral piece or from multiple pieces. The multiple pieces may be connected to one another using any attachment technique as described elsewhere herein (e.g., fasteners, adhesives). The multiple pieces may form an upper housing portion and a lower housing portion. The multiple pieces may form a central portion and one or more branching portions. The housing may or may not prevent dust from entering within the housing. The component protection apparatus may be enclosed by the housing. Alternatively, the component protection apparatus may be external to the housing, or be at least partially incorporated in the housing. The component protection apparatus may or may not be directly exposed to the ambient conditions.

The movable object may include a central body. The movable object may have one or more arms or branches extending from the central body. One or more propulsion units may be supported by the one or more arms or branches. The component protection apparatus may be provided on or in the central body. The component protection apparatus may be provided on or within one or more arms or branches. The component protection apparatus may be provided at a single location on the movable object or distributed over multiple parts of the movable object. A single component protection apparatus may be provided on a movable object, or multiple component protection apparatuses may be provided. The component protection apparatus may be sized and/or dimensioned to permit a movable object having any of the characteristics described elsewhere herein to operate. For instance, the component protection apparatus may be sized and/or dimensioned to permit a UAV having any of the characteristics described elsewhere herein to take off.

The component protection apparatus may protect the component on-board the movable object while permitting the component to operate. The component may operate to sense a condition and/or control operation of one or more function or device of the movable object.

The systems, devices, and methods described herein can be applied to a wide variety of movable objects. As previously mentioned, any description herein of a component protection apparatus may apply to and be used for a component protection apparatus carried by any movable object or substantially stationary object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a remotely controlled vehicle described elsewhere herein. In some embodiments, the movable object can be mounted on a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. The propulsion system may include any number of propulsion units. For instance, one or more, two or more, three or more, four or more, five or more, six or more, eight or more, ten or more, fifteen or, or twenty or more propulsion units may be provided. A propulsion unit may include a rotor. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. Optionally, a ratio of a movable object weight to a load weight may be greater than, less than, or equal to about 1:1. When desired, the ratio of a movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
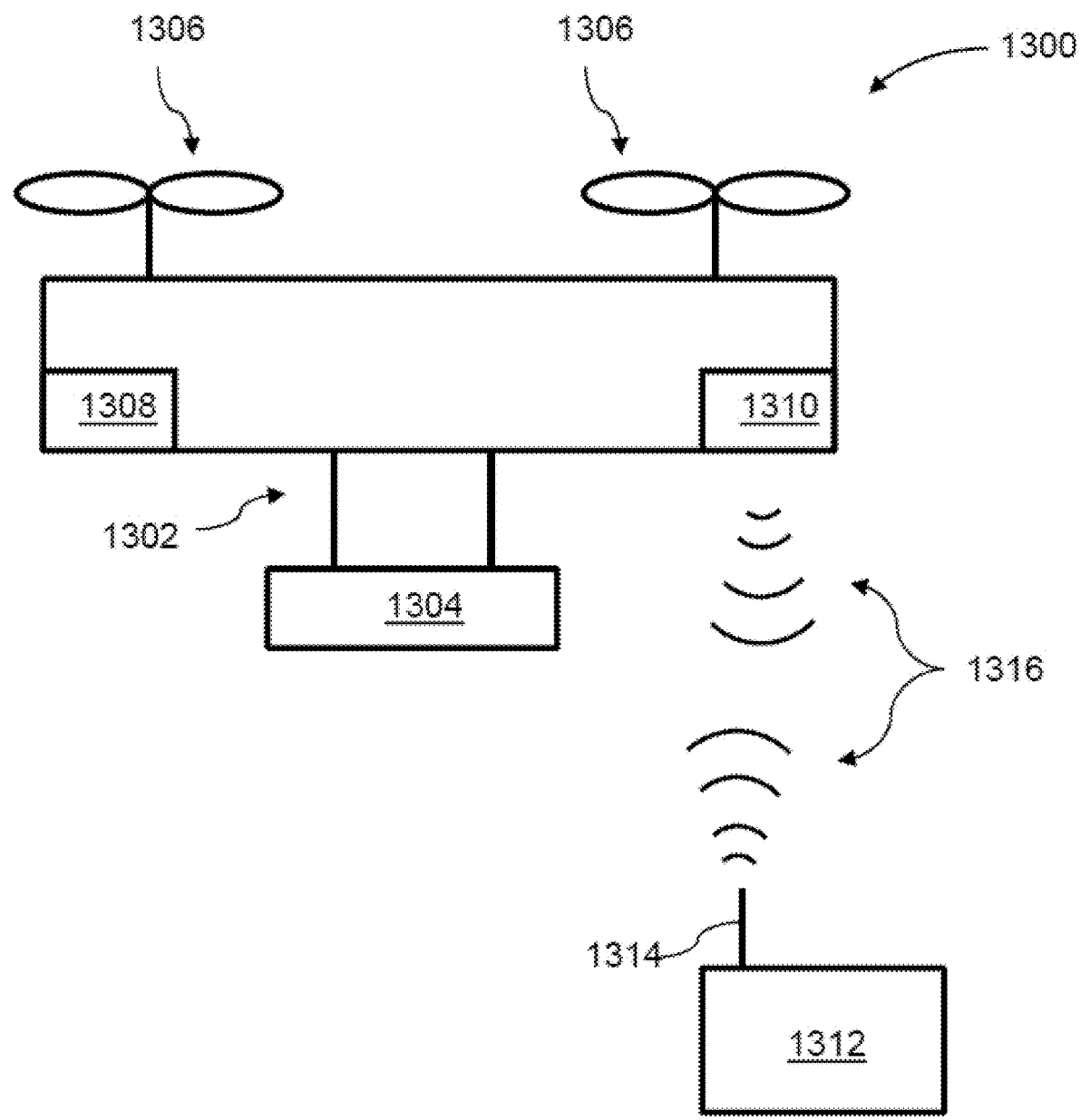
FIG. 13 shows an example of a movable object including a carrier and a payload, in accordance with embodiments of the disclosure.

FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV).

In some embodiments, the movable object 1300 may be a UAV. The UAV can include a propulsion system any number of rotors (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 7 m, from 70 cm to 2 m, or from 5 cm to 5 m. Any description herein of a UAV may apply to a movable object, such as a movable object of a different type, and vice versa.

In some instances, the payload 1304 may be provided on the movable object 1300 without requiring the carrier 1302. The movable object 1300 may include propulsion mechanisms 1306, a sensing system 1308, and a communication system 1310. The propulsion mechanisms 1306 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation.

For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. In some embodiments, the terminal may include an image analyzer, a motion sensing module, and/or a motion controller as described elsewhere herein. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A component protection apparatus comprising:
   a chamber configured to:
      enclose a component that is to be protected, and
      contain a liquid that surrounds the component, the liquid being configured to reduce an amount of an impact on the chamber that is transferred to the component;
   a pressure adjustment mechanism configured to adjust a pressure of the liquid within the chamber, the pressure adjustment mechanism being in fluid communication with an interior of the chamber via a first liquid passage; and
   a temperature control system configured to permit heating and cooling of the liquid, the temperature control system being in fluid communication with the interior of the chamber via a second liquid passage different from the first liquid passage and being fluidically separated from the pressure adjustment system.

2. The apparatus of claim 1, wherein the chamber includes a spherical chamber and is formed from a rigid material.

3. The apparatus of claim 1, wherein the component includes at least one of a controller of a movable object that comprises the chamber or an inertial sensor.

4. The apparatus of claim 1, wherein the component is electrically connected to a propulsion unit of a movable object that comprises the chamber.

5. The apparatus of claim 1, wherein the component is positioned within an inner container that is enclosed by the chamber, the inner container having a spherical shape and including a silicone ball.

6. The apparatus of claim 5, wherein the inner container permits the liquid to contact the component.

7. The apparatus of claim 5, wherein the inner container does not permit the liquid to contact the component.

8. The apparatus of claim 5, wherein the inner container is supported within the chamber with aid of one or more dampeners, the one or more dampeners including one or more silicone pillars.

9. The apparatus of claim 1, further comprising:
an outer container that encloses the chamber.

10. The apparatus of claim 9, wherein the chamber is supported within the outer container with aid of one or more dampeners, the one or more dampeners including one or more springs.

11. The apparatus of claim 9, further comprising at least one of air or a liquid between the outer container and the chamber.

12. The apparatus of claim 9, wherein the outer container is formed from a rigid material and having a spherical shape.

13. The apparatus of claim 1, wherein the liquid includes an electrical insulator.

14. The apparatus of claim 1, wherein the temperature control system comprises:
a heating element located external to the chamber and configured to heat the liquid, the heating element including an electric heating module; and
a cooling element located external to the chamber and configured to cool the liquid, the cooling element including a Peltier device.

15. The apparatus of claim 1, wherein the temperature control system comprises a Peltier device configured to:
heat the liquid in response to a positive current being applied to the Peltier device, and
cool the liquid in response to a negative current being applied to the Peltier device.

16. The apparatus of claim 1, wherein:
the pressure adjustment mechanism comprises a pump.

17. The apparatus of claim 16, wherein the pump is located external to the chamber.

18. The apparatus of claim 16, further comprising:
a liquid reservoir in fluid communication with the pump, wherein liquid is provided from the reservoir to within the chamber with aid of the pump to increase the pressure of the liquid contained within the chamber, or from the chamber to the reservoir to decrease the pressure contained within the chamber.

19. A movable object comprising:
one or more propulsion units; and
the component protection apparatus of claim 1,
wherein the component communicates with the one or more propulsion units.

20. A method for protecting a component comprising:
enclosing a component that is to be protected within a chamber, the chamber being configured to contain a liquid that surrounds the component, and the liquid being configured to reduce an amount of an impact on the chamber that is transferred to the component;
providing a pressure adjustment mechanism configured to adjust a pressure of the liquid within the chamber, the pressure adjustment mechanism being in fluid communication with an interior of the chamber via a first liquid passage; and
providing a temperature control system configured to permit heating and cooling of the liquid, the temperature control system being in fluid communication with the interior of the chamber via a second liquid passage different from the first liquid passage and being fluidically separated from the pressure adjustment system.

* * * * *